(12) United States Patent
Kyo

(10) Patent No.: US 9,639,337 B2
(45) Date of Patent: May 2, 2017

(54) ARITHMETIC AND CONTROL UNIT, ARITHMETHIC AND CONTROL METHOD, PROGRAM AND PARALLEL PROCESSOR

(75) Inventor: Shorin Kyo, Kanagawa (JP)

(73) Assignee: RENESAS ELECTRONICS CORPORATION, Kawasaki-shi, Kanagawa (JP)

( * ) Notice: Subject to any disclaimer, the term of this patent is extended or adjusted under 35 U.S.C. 154(b) by 781 days.

(21) Appl. No.: 13/529,973

(22) Filed: Jun. 21, 2012

(65) Prior Publication Data
US 2013/0024667 A1 Jan. 24, 2013

(30) Foreign Application Priority Data
Jul. 20, 2011 (JP) ................................. 2011-159396

(51) Int. Cl.
G06F 9/30 (2006.01)
G06F 9/45 (2006.01)

(52) U.S. Cl.
CPC .............. G06F 8/453 (2013.01); G06F 8/423 (2013.01)

(58) Field of Classification Search
None
See application file for complete search history.

(56) References Cited

PUBLICATIONS

The OpenCL Specification, Ver:1.0, Document Revision:43, Khronos OpenCL Working Group (2009).
European Search Report dated Sep. 19, 2012.
Jarle Erdal Steinsland: "Auto-tunable GPU BLAS", (pp. 5-8, pp. 21-24, p. 29), Jun. 2011, XP55037708.
"The OpenCL Specification— Version: 1.0", (pp. 33-39), Oct. 6, 2009, pp. 1-308, XP55034162.
Chinese Office Action dated Dec. 30, 2015 with English translation.
Communication pursuant to Article 94(3) EPC dated Jul. 1, 2016.

*Primary Examiner* — Corey S Faherty
(74) *Attorney, Agent, or Firm* — McGinn IP Law Group, PLLC

(57) ABSTRACT

An attribute group storage unit acquires and holds attribute groups set to respective data blocks. A scenario determination unit determines respective transfer systems of the respective blocks between a memory of the lowest hierarchy and a memory of another hierarchy based on those attribute groups and a configuration of an arithmetic unit which is the parallel processor, and controls the transfer of the respective data blocks according to the determined transfer systems, and the parallel arithmetic operation corresponding to the transfer. Each of the attribute groups is necessary to determine the transfer systems, and includes one or more attributes not depending on the configuration of the parallel processor. The attribute groups of the write blocks are set assuming that each of the write blocks has already been located in the memory of another hierarchy, and is transferred to the memory of the lowest hierarchy.

8 Claims, 23 Drawing Sheets

---

1. DESIGNATION OF ATTRIBUTE GROUPS
   (1) SPECIFIC ATTRIBUTE: ATTRIBUTE IRRELEVANT TO ARITHMETIC CONTENTS AND USER'S INTENTION
   (2) ARITHMETIC ATTRIBUTE: ATTRIBUTE RELEVANT TO ARITHMETIC CONTENTS BUT IRRELEVANT TO USER'S INTENTION
   (3) POLICY ATTRIBUTE: ATTRIBUTE RELEVANT TO ARITHMETIC CONTENTS AND USER'S INTENTION
   ALL OF THE ATTRIBUTES ARE IRRELEVANT TO CONFIGURATION OF DEVICE

2. DESIGNATION OF USER PROCESSING
   THIS IS DESIGNATION OF ARITHMETIC CONTENTS, AND IRRELEVANT TO CONFIGURATION OF DEVICE

FIG. 10

EXAMPLE OF PARAMETERS REPRESENTING CONFIGURATION OF ARITHMETIC UNIT

- PRIVATE MEMORY CAPACITY OF EACH WORK ITEM (WI): 1 KB
- LOCAL MEMORY CAPACITY OF EACH WORK GROUP (WG): 4 KB
- MAXIMUM VALUE OF WG SIZE (WGs): 32
- MAXIMUM VALUE OF THE NUMBER OF WGs: 16

FIG. 12

- WORK GROUP SIZE WGs = 32
- <HIERARCHY 1>
  - PRIVATE MEMORY SHARE (Y-DIRECTION SIZE Sbsy OF SUB-BLOCK) FOR EACH WI OF RESPECTIVE DATA BLOCKS WHEN THE NUMBER OF DIVISIONS IS 4
  - READ BLOCK Q: 129×2B FOR EACH WI (=0.258KB/WI)
  - WRITE BLOCK R: 120×4B FOR EACH WI (=0.480KB/WI)
  - THE NUMBER OF ITERATIONS: 5 (=THE NUMBER OF DIVISIONS 4×(640÷WG SIZE 32)÷THE NUMBER OF WGs 16)
- <HIERARCHY 2>
  - THE NUMBER OF DIVISIONS: 1
  - READ BLOCK P
  - TO LOCAL MEMORIES "WITHOUT DIVISION"
  - THE NUMBER OF ITERATIONS: 1

FIG. 13

1. DESIGNATION OF ATTRIBUTE GROUPS (1) SPECIFIC ATTRIBUTE: ATTRIBUTE IRRELEVANT TO ARITHMETIC CONTENTS AND USER'S INTENTION
(2) ARITHMETIC ATTRIBUTE: ATTRIBUTE RELEVANT TO ARITHMETIC CONTENTS BUT IRRELEVANT TO USER'S INTENTION
(3) POLICY ATTRIBUTE: ATTRIBUTE RELEVANT TO ARITHMETIC CONTENTS AND USER'S INTENTION
ALL OF THE ATTRIBUTES ARE IRRELEVANT TO CONFIGURATION OF DEVICE

2. DESIGNATION OF USER PROCESSING

THIS IS DESIGNATION OF ARITHMETIC CONTENTS, AND IRRELEVANT TO CONFIGURATION OF DEVICE

FIG. 14

CASE USING ONLY GLOBAL MEMORY (RELATED ART)

```
kernel  USERFUNC (
   global char* P, global short *Q, global long* R
) {
   int gx = get_global_id(0);
   int gw= get_global_size(0);
   long r;

for (int x = 0; x < 640/gw; x++) {
     for ( int y = 0; y < 480; y++) {
       for (int i=0, r=0;  i<9; i++)
          r += P[ i ] * Q[ (y+i)*640 + x*gw + gx ];
       R [ y*640 + gx + x*gw ]; = r;
     }
   }
}
```

FIG. 15

CASE USING PRIVATE MEMORIES AND LOCAL MEMORIES (RELATED ART)

```
define ITER 16   // Works to be assigned to each work-item kernel USERFUNC (local char* lp,
  global char* P, global short *Q, global long* R
) {
    int gx = get_global_id(0);
    int gw= get_global_size(0);
    short pq[ITER+9];   // Ensure private memory area for each wi
    long r;

// Copy P to local memory area
    if (gw>9) {
      if (gx<=9)  lp[gx] = P[gx];
    } else if (gx==0) { // let one wi to do the copy
       for (int y=0;  y<9; y++) lp[y] = P[y];
    } for (int x = 0; x < 640/gw; x++) {
      for ( int y = 0; y < 480/ITER; y++) {

// Copy Q to private memory area
        for (int i=0; i<ITER+9; i++)
          pq[ i ] = Q[ (y*ITER + i)*640 + x*gw + gx ];

for (int l=0; l<ITER; l++) {
          for (int i=0, r=0;  i<9; i++)
             r += lp[ i ] * pq[ l+i ];
          R [(y*ITER + l) *640 + x*gw + gx ] = r;
        }
      }
    }
}
```

FIG. 16

KERNEL EXAMPLE USED IN OpenCL SYSTEM 100

```
USERFUNC (
  local char* P, short *Q, long* R
) {
    int iter = get_acl_local_size(0);
    long r;

for (int I = 0; I < iter; I++, R++) {
        for (int i=0, r=0; i<9; i++)
            r += P[ i ] * Q[ I+i ];
        *R = r;
    }
}
```

FIG. 17

```
define ITER 16   // Number of work to be assigned to each wi kernel USERFUNC (local char* lp, local short *lq0, local short *lq1,
   global char* P, global short *Q, global long* R
) {
    int gx = get_global_id(0);
    int gw= get_global_size(0);
    short pq[ITER+9];   // Ensure private memory area for each wi
    local short* tmp;
    event_t event0, event1;
    long r;

// Copy P to local memory area
    if (gw>9) {
       if (gx<=9)  lp[gx] = P[gx];
    } else if (gx==0) { // let one wi to do the copy
       for (int y=0;  y<9; y++) lp[y] = P[y];
    }
    for (int x = 0; x < 640/gw; x++) {
       // Async copy Q to local memory area (first)
       event0 = async_work_group_copy(Q+...,lq0,(ITER+9)*gw);

for ( int y = 0; y < 480/ITER; y++) {

// Async copy Q to local memory area (next)
          event1 = async_work_group_copy(Q+...,lq1,(ITER+9)*gw);

// Wait for event0 to finish
          wait_group_events(1, &event0);
          event0 = event1;

// Copy from local to private memory area
          for (int i=0; i<ITER+9; i++)
             pq[ i ] = lq0[ i ];

for (int l=0; l<ITER; l++) {
             for (int i=0, r=0;  i<9; i++)
                r += lp[ i ] * pq[ l+i ];
             R [(y*ITER + l) *640 + x*gw + gx ]; = r;
          }
          // swap buffer
          tmp = lq0;
          lq0=lq1;
          lq1 = tmp;
       }
       wait_group_events(1, &event0);
    }
}
```

FIG. 21

|  | GLOBAL | CONSTANT | LOCAL | PRIVATE |
|---|---|---|---|---|
| HOST | DYNAMIC ALLOCATION<br><br>READ/WRITE ACCESS | DYNAMIC ALLOCATION<br><br>READ/WRITE ACCESS | DYNAMIC ALLOCATION<br><br>NO ACCESS | NO ALLOCATION<br><br>NO ACCESS |
| KERNEL | NO ALLOCATION<br><br>READ/WRITE ACCESS | STATIC ALLOCATION<br><br>READ-ONLY ACCESS | STATIC ALLOCATION<br><br>READ/WRITE ACCESS | STATIC ALLOCATION<br><br>READ/WRITE ACCESS |

FIG. 22

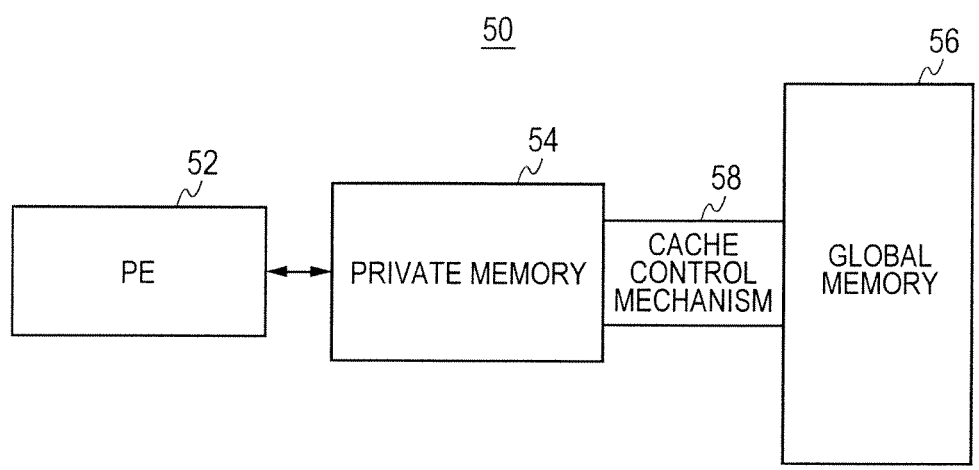

FIG. 24

1. DESIGNATION FOR READ TRANSFER

THIS INCLUDES PORTIONS DEPENDING ON CONTENTS OF ARITHMETIC PROCESSING AND CONFIGURATION OF DEVICE (REFER TO FOLLOWING EXAMPLES)

- EXAMPLE 1: DESIGNATION OF WHETHER READ BLOCK IS DIVIDED, OR NOT
   - EXAMPLE 2: DESIGNATION OF DIVIDING METHOD WHEN READ BLOCK IS DIVIDED
   - EXAMPLE 3: DESIGNATION OF ASSOCIATING METHOD BETWEEN SUB-READ BLOCKS INCLUDED IN RESPECTIVE DIFFERENT READ BLOCKS WHEN READ BLOCK IS DIVIDED

2. DESIGNATION OF ARITHMETIC PROCESSING FOR READ BLOCK OR SUB-BLOCK

THIS INCLUDES PORTIONS DEPENDING ON CONFIGURATION OF DEVICE (REFER TO FOLLOWING EXAMPLE)

- EXAMPLE 4: DESIGNATION OF THE NUMBER OF PARALLEL EXECUTIONS TOGETHER WITH DESIGNATION FOR READ TRANSFER

3. DESIGNATION FOR WRITE TRANSFER

THIS INCLUDES PORTIONS DEPENDING ON CONTENTS OF ARITHMETIC PROCESSING AND CONFIGURATION OF DEVICE (REFER TO FOLLOWING EXAMPLE)

- EXAMPLE 5: DESIGNATION TOGETHER WITH DESIGNATION FOR READ TRANSFER

ARITHMETIC AND CONTROL UNIT, ARITHMETHIC AND CONTROL METHOD, PROGRAM AND PARALLEL PROCESSOR

CROSS-REFERENCE TO RELATED APPLICATIONS

The disclosure of Japanese Patent Application No. 2011-159396 filed on Jul. 20, 2011 including the specification, drawings and abstract is incorporated herein by reference in its entirety.

BACKGROUND

The present invention relates to an arithmetic and control technique of a parallel processor.

In recent years, from the need to suppress the heating of the processor, there has been a pronounced tendency to realize an improvement in performance by increasing the number of processor cores (hereinafter referred to merely as "cores") that conduct processing in parallel instead of an increase in the operating frequency of the processor. The processors each having a plurality of cores are called "multicore processor", and the processors each having an especially large number of cores among the multicore processors are called "many-core processor". In the present specification, there is particularly no distinction between the multicore processors and the many-core processors, and the processors each having a plurality of cores that conducts processing in parallel are generally called "parallel processors".

The parallel processors have been used in a variety of fields as accelerators. However, a variety of accelerators have been manufactured depending on the manufacturers or the fields, and languages and frameworks for the accelerators have been also variously developed. This makes it difficult to port program codes between the accelerators.

In order to solve this problem, an OpenCL (open computing language) is determined as a standard framework for the parallel processor (The OpenCL Speciation, Ver: 1.0, Document Revision: 43, Khronos OpenCL Working Group (2009)). An outline of the OpenCL will be described.

FIG. 19 illustrates a platform model of a typical OpenCL system in which reference numerals are added to FIG. 3.1 in The OpenCL Speciation, Ver: 1.0, Document Revision: 43, Khronos OpenCL Working Group (2009).

As illustrated in FIG. 19, an OpenCL system 10 includes a host 12 and one or more compute devices (hereinafter referred to as "OpenCL devices") 14. The OpenCL devices 14 correspond to the above-mentioned accelerators.

Each of the OpenCL devices 14 has one or more compute units (hereinafter referred to as "CUs") 16, and each of the CUs 16 has one or more processing elements (hereinafter referred to as "PEs") 18. The PEs 18 correspond to the above-mentioned cores.

The application of the OpenCL includes a program code that operates on the host 12 side, and program codes that operate in the OpenCL devices 14, that is, on the accelerator side. The program code that operates on the host 12 side is called "host code", and the program codes that operate on the OpenCL devices 14 side are called "Kernel".

The host 12 calls an API (application program interface) for instruction of arithmetic operation. Each of the OpenCL devices 14 executes the instructed arithmetic operation. The host 12 generates a context for managing resources, and also generates command queues for adjusting device operation through the OpenCL. The "device operation" includes the execution of arithmetic operation, the operation of a memory, and synchronization.

In the OpenCL, the Kernel is executed in an N-dimensional index space ($1 \leq N \leq 3$) as a work-item (hereinafter called "item" for short). For example, if (4, 6) is designated as the two-dimensional index space, 24 items of 4×6 in total are executed.

One PE is used for execution of one item. Accordingly, if the number of items to be executed in parallel is identical with the number of PEs really existing with the items, the Kernel is executed on 24 PEs of 4×6 in total.

If the number of existent PEs is smaller than the number of items to be executed in parallel, the parallel execution of the items is repeated on the existent PEs. If there are, for example, only 6 PEs of 2×3 in total, when the above-described index space of (4, 6) is designated, it is necessary to repeat the parallel execution of 6 items by the 6 PEs four times.

Also, in the OpenCL, a concept of a work group is introduced. The work group is an assembly of items that are executed on the same CU 16 and associated with each other. The respective items within the same work group execute the same Kernel, and share a local memory of the CU 16, which will be described later.

Unique group IDs are allocated to the respective work groups, and the items within each work group have unique local IDs allocated thereto within the work group. Unique global IDs are also allocated to the items. The items can be identified by the combination of the global ID or the group ID with the local ID.

A process for allowing the OpenCL devices 14 to conduct arithmetic processing is configured by calling the API in the following step order.

<Step 1>: Reference data (hereinafter referred to as "reference data") for the arithmetic processing and the Kernel are transferred from the host 12 of the OpenCL devices 14.

<Step 2>: The Kernel starts to be executed on each of the OpenCL devices 14 in response to "Kernel start command".

<Step 3>: After completion of the execution of the Kernel in the OpenCL device 14, result data of the arithmetic processing is transferred to the host 12 side from the memory space of the OpenCL device 14.

A configuration of the OpenCL device 14 including the memory space will be described with reference to FIG. 20. In FIG. 20, reference numerals are added to FIG. 3.3 in "The OpenCL Speciation, Ver: 1.0, Document Revision: 43, Khronos OpenCL Working Group (2009)". As described above, each of the OpenCL devices 14 includes one or more CUs 16, and each of the CUs 16 has one or more PEs 18.

In the execution of the Kernel in the above-described Step 2, four different memories may be accessed in each of the OpenCL devices 14. Those four memories include private memories 20, local memories 22, a global memory 32, and a constant memory 34. Those four memories will be described with reference to FIG. 21 from the viewpoint of the items and the work groups. FIG. 21 illustrates Table 3.1 in "The OpenCL Speciation, Ver: 1.0, Document Revision: 43, Khronos OpenCL Working Group (2009)".

Each of the private memories 20 corresponds to one item, and is used for only execution of the item. A variable defined for the private memory 20 corresponding to one item cannot be used for the other items.

Each of the local memories 22 corresponds to one group, and can be shared by the respective items within the group. For that reason, as an intended purpose of the local memories 22, for example, the variables shared by the respective items within the group are allocated to the local memory 22.

The global memory 32 and the constant memory 34 can be accessed from all of the items within all of the groups. The global memory 32 can be accessed for both of read and write from the items. On the other hand, the constant memory 34 can be accessed for only read from the items. Hereinafter, the global memory 32 and the constant memory 34 are collectively called "device memory 30".

From the one-to-one relationship between the items and the PEs 18, the correspondence relationship among the above four different memories, and the CUs 16 and the PEs 18 will be described below.

The private memories 20 correspond one-to-one to the PEs 18, and can be accessed by only the corresponding PEs 18.

The local memories 22 correspond one-to-one to the CUs 16, and can be accessed by all of the PEs 18 within the corresponding CUs 16.

The device memory 30 can be accessed by all of the PEs 18 within all of the CUs 16, that is, all of the PEs within the OpenCL devices 14.

Also, a cache 24 that functions as a cache memory of the device memory 30 is further provided depending on each of the OpenCL devices 14.

Thus, each of the OpenCL devices 14 is equipped with a plurality of memories different in hierarchy. Those memories can be accessed from the PEs at a higher speed as the hierarchy is higher. The hierarchy becomes higher in the order of the device memory 30 (lowest), the local memories 22 (middle), and the private memories 20 (highest), and the access speed from the PEs becomes higher in the same order.

In order to sufficiently bring out the performance of the OpenCL devices 14, it is necessary to devise data movement between the device memory 30 and the private memories 20 or the local memories 22, for example, such that data higher in use frequency moves to a higher-speed memory space, and then is referred to.

Even in the case of a sequential processor different in the control system from the OpenCL device, the data movement is conducted between a global memory space and a private memory space. The data movement will be described with reference to an example of the sequential process illustrated in FIG. 22.

A sequential processor 50 illustrated in FIG. 22 includes a PE 52 which is an arithmetic element, a private memory 54, a global memory 56, and a cache control mechanism 58.

As illustrated in FIG. 22, a storage device of the sequential processor 50 is classified into the private memory 54 and the global memory 56. The private memory 54 is physically an on-chip low-capacity memory, and the global memory 56 is physically an on-chip high-capacity memory.

In the sequential processor 50, the storage device is classified into the private memory 54 and the global memory 56. The data movement between the private memory 54 and the global memory 56 is automatically conducted by the cache control mechanism 58 disposed between the private memory 54 and the global memory 56, and a user of the sequential processor 50 can see nothing but one large memory space. That is, the user of the sequential processor 50 can easily develop a user program allowing the PE 52 to conduct the arithmetic processing without planning how to move data between the global memory 56 and the private memory 54.

SUMMARY

Incidentally, when a large number of cores (PEs) are mounted on the parallel processor, particularly, the OpenCL devices 14 illustrated in FIG. 20, there are the private memories 20 of the same number as that of the cores, and there are also the local memories 22 of the same number as that of the CUs 16. That those memories are managed by one cache control mechanism in a unified manner is generally difficult to realize because the costs of hardware are high.

On the other hand, if there is no cache control mechanism, the use of the OpenCL system 10 (hereinafter referred to merely as "user") can see a plurality of memory spaces. As described above, in order to pursue the higher performance such that data higher in use frequency moves to the higher-speed memory space (that is, memory space of higher hierarchy), and then is referred to, it is necessary to allow the user program to explicitly give an instruction for the data movement between the memories different in hierarchy associated with the arithmetic processing. In order to precisely realize this processing, the user needs to have knowledge related to a speed difference, a capacity difference, and a function difference between the above-mentioned respective memories. A specific example of the processing will be described with reference to FIG.

FIG. 23 is a diagram illustrating a case of executing the arithmetic processing for obtaining data blocks A' and B' from a plurality of data blocks (data blocks A to D). Kernel transfer from the host to the device is omitted from FIG. 23. Also, the data blocks A to D are reference data transferred from the host 12 to the OpenCL devices 14 in Step 1 described above, and stored in the global memory 32. The data blocks A' and B' are the results of arithmetic operation that has been conducted on the data blocks A to D in the above-mentioned Step 2, which are written into the global memory 32 and thereafter transferred to the host 12 in the above-mentioned Step 3.

Now, the processing of Step 2, that is, arithmetic processing for executing the Kernel will be described. In the following present specification, a plurality of the private memories are called "private memory group".

Unless the performance of the arithmetic processing is pursued, there is conceived a technique using only the global memory 32 without using the private memory group or the local memories 22 in the arithmetic operation. In this case, there is no data transfer between the global memory 32 and the private memory group, that is, the local memories 22.

This technique is simple in the control but low in the performance. In order to conduct the arithmetic processing with the higher performance, there is used the method in which arithmetic operation is conducted after data to be subjected to arithmetic operation has been transferred from the global memory 32 to the private memory group or the local memories 22 as described above, and the arithmetic results are transferred to the global memory 32 after being stored in the private memory group or the local memories 22.

A procedure (Steps A to C) when all of the items can be executed in parallel at the same time will be first described in the case using the above technique. That "all of the items can be executed in parallel at the same time" represents that the number of PEs is equal to or larger than the total number of items, and the capacities of the private memory group and the local memories can store all of data to be subjected to the arithmetic operation. In this case, the transfer of data to be subjected to arithmetic operation from the global memory 32 to the private memory group or the local memories 22, the parallel execution of arithmetic operation in the respective PEs 18, and the transfer of the arithmetic results from the private memory group or the local memories 22 to the global memory 32 are executed only once.

<Step A> The data blocks A to D stored in the global memory 32 are transferred to the private memory group or the local memories 22.

This transfer represents that data used for only the PEs 18 among data to be subjected to arithmetic operation is transferred to the private memories of the PEs 18, and the data shared by the plural PEs 18 is transferred to the local memories 22.

In the following description, the data transfer from the global memory 32 to the private memory group or the local memories 22 is called "read transfer". Also, data blocks to be subjected to read transfer such as the data blocks A to D are called "read blocks RB".

<Step B> The arithmetic processing is executed on the respective PEs 18, and the results of the arithmetic processing are stored in the private memory group or the local memories 22 that can be accessed by the PEs 18.

<Step C> The data blocks A' and B' obtained through the aromatic processing of Step B and stored in the private memory group or the local memories 22 are transferred to the global memory 32.

In the following description, the data transfer from the private memory group or the local memories 22 to the global memory 32 is called "write transfer". Also, the data blocks that are stored in the private memory group or the local memories 22 and write-transferred, such as the data blocks A' and B' are called "write block WBs".

It is necessary to explicitly designate all of the above three steps in the Kernel created by the user. Those designations include the contents of the arithmetic processing, and the contents depending on the configuration of the OpenCL devices 14 (the number of PEs (=the number of private memories), the capacity of the individual private memories, the capacity of the local memories, etc.).

For example, it is assumed that there is a plurality of read blocks RB to be subjected to the arithmetic operation, and the respective read blocks RBs must be divided into sub-blocks because all of the read blocks RB cannot be stored in the private memory group or the local memories 22 within one work group. In this case, it is necessary to designate a method of associating the respective sub-blocks with each other in Step A, for the plural read blocks RB. The "associating method" of the sub-blocks with each other in the read blocks RB represents that the respective sub-blocks in any read block RB among the sub-blocks in the plural read blocks RB are transferred to the private memory group within the same work group, or the local memories 22 within the same work group. The contents of the arithmetic processing, and how to divide the read blocks RBs depend on the configuration of the OpenCL devices 14.

Likewise, when there are a plurality of write blocks WB as the arithmetic results, there is also a need to designate the associating method in a sense that the respective sub-blocks of the plural write blocks WB are obtained as the arithmetic results under the combination of the respective sub-blocks of any read block RB. That is, the contents of the respective sub-blocks in the write blocks WBs are data stored in the private memory group of each work group, or the local memories 22 as the arithmetic results. The transfer of the write blocks WBs to the global memory 32 represents that the data is written at the respective sub-block positions of the write blocks WBs within the global memory 32. As in the read blocks RB associating method, the write block WB associating method depends on the contents of the arithmetic processing, and the configuration of the OpenCL devices 14.

As described above, except for a case in which the entire required data blocks cannot be stored in the memories within the work group, even when the total number of PEs is smaller than the size of the index space is smaller than the size of the index space, all of the items cannot be executed in parallel at the same time. Therefore, it is necessary to repeat the parallel execution of the items by the PEs plural times. It is needless to say that read transfer and write transfer need to be repeated according to the repetition of the parallel execution. In this case, it is necessary to designate the data block dividing method and the method of associating the sub-blocks obtained by dividing the data block with each other according to the contents of the arithmetic processing and the configuration of the OpenCL devices 14.

The "dividing method" of the data block represents how the data block is divided into the sub-blocks. The "sub-block SB" is a transfer unit of the read transfer and the write transfer. In the following description, when it is necessary to distinguish between read and write, the sub-block obtained by dividing the read block RB is called "sub-read block SRB", and the sub-block obtained by dividing the write block WB is called "sub-write block SWB".

The "associating method" between the sub-blocks SB represents which sub-blocks SB included in the respective different read block or write block are located on the same private memory group or the same local memory 22 at the same time.

The dividing method of the data block depends on the configuration of the OpenCL devices 14 whereas the associating method of the sub-blocks depends on the contents of the arithmetic processing. If the division becomes required, the designation becomes further complicated as compared with a case in which the data block is not divided.

FIG. 24 illustrates the contents required to be designated by the user in order to allow the OpenCL devices 14 to conduct the arithmetic processing.

As illustrated in the figure, a first portion is the designation for read transfer, and includes a portion depending on the contents of the arithmetic processing and the configuration of the OpenCL devices 14.

The portion depending on the contents of the arithmetic processing and the configuration of the OpenCL devices 14 includes, for example, the designation of whether the read blocks RB is divided, or not (Example 1), the designation of the dividing method when the division is conducted (Example 2), and the designation of the associating method between the sub-read blocks SRB (Example 3).

A second portion is the designation of the arithmetic processing on the read blocks RB or the sub-read block SRB. The second portion depends on the contents of the arithmetic processing because of the contents for designating the arithmetic processing. Further, the second portion includes the contents depending on the configuration of the OpenCL devices 14 such as the designation of the number of parallel executions of the items (Example 4) because this portion needs to comply with an instruction for read transfer.

A third portion is the designation for write transfer, and naturally includes a portion (Example 5) depending on the contents of the arithmetic processing and the configuration of the OpenCL devices 14 because this portion needs to comply with the instruction for read transfer.

Thus, in order to pursue the higher performance, the user needs to develop the Kernel (user code) in compliance with the contents of the arithmetic processing and the configuration of the OpenCL devices 14.

However, even when the devices comply with the OpenCL, if the manufacturers are different, the capacities of the respective memory spaces, the access delays, and the availability of the cache control are enormously different from each other. For that reason, there is a possibility that the user code in which the data movement between the memories different in the hierarchy has been ideally developed for one OpenCL device reversely provokes performance degradation for other OpenCL devices or the OpenCL devices identical in the series but different in the generation. That is, the portability of the user code in the performance is low.

In order to realize some degree of performance portability, it is conceivable that the user code is not developed for a specific OpenCL device, but the user code is created while preferably keeping the configurations of a wide variety of existing OpenCL devices in mind. However, the above operation is felt as a heavy load by a designer of the arithmetic processing because of no essential operation. Further, the operation provokes the deterioration of readability of the codes and an increase in the complication.

The present invention has been made in view of the above circumstances, and therefore aims at providing a technique for reducing a load on a developer of the user codes and enhances the portability of the user codes for data movement among a plurality of memories different in hierarchy associated with the arithmetic processing.

According to one aspect of the present invention, there is provided an arithmetic and control method that controls parallel arithmetic operation by a plurality of arithmetic elements of a parallel processor having the plurality of arithmetic elements, and a plurality of memories different in hierarchy which is disposed for the plurality of arithmetic elements.

The method includes two steps. A first step acquires and holds attribute groups set to each of read blocks in which data to be subjected to the parallel arithmetic operation is transferred to a memory of another hierarchy in one or more data blocks stored in a memory of a lowest hierarchy among the plurality of memories, and write blocks that are an arithmetic result of the parallel arithmetic operation conducted on the one or more read blocks in one or more data blocks which are transferred from the memory of the another hierarchy to the memory of the lowest hierarchy after the parallel arithmetic operation.

A second step determines a transfer system of each of the read blocks and the write blocks on the basis of each of the held attribute groups and a configuration parameter representing a configuration of the parallel arithmetic operation, and control the transfer of each of the read block and the write block according to the determined transfer system, and the parallel arithmetic operation corresponding to the transfer.

The attribute group is necessary for determining the transfer system, and includes one or more attribute not depending on the configuration of the parallel processor. The attribute group of the write block is set assuming that the write block has already been located in the memory of the another hierarchy, and is transferred to the memory of the lowest hierarchy.

An expression that the method of the above aspect is replaced with a device, a system including the device, a parallel processor that realizes the method, and a program that allows a computer to execute the method are also useful as the aspects of the present invention.

According to the technique of the present invention, the load on the developer of the user codes can be reduced, and the portability of the user codes can be enhanced for data movement among the plurality of memories different in hierarchy associated with the arithmetic processing in the parallel processor such as the OpenCL device.

BRIEF DESCRIPTION OF THE DRAWINGS

FIG. 10 is a diagram illustrating an example of parameters illustrating a configuration of an arithmetic unit in the OpenCL system illustrated in FIG. 1;

FIG. 12 is a diagram some of the contents determined by a scenario determination unit in the example illustrated in FIG. 2;

FIG. 13 is a diagram illustrating the contents required to be designated by the user in the OpenCL system illustrated in FIG. 1;

FIG. 14 is a diagram illustrating one example of a Kernel when the arithmetic operation illustrated in FIG. 2 is intended to be realized by a related art technique (No. 1);

FIG. 15 is a diagram illustrating another example of the Kernel when the arithmetic operation illustrated in FIG. 2 is intended to be realized by the related art technique (No. 2);

FIG. 16 is a diagram illustrating an example of the Kernel when the arithmetic operation illustrated in FIG. 2 is intended to be realized by the OpenCL system illustrated in FIG. 1;

FIG. 17 is a diagram illustrating an example of the Kernel when the arithmetic operation illustrated in FIG. 2 is intended to be realized by an OpenCL device that accepts an asynchronous memory transfer by the related art technique;

FIG. 21 is a diagram illustrating various memories in the OpenCL device;

FIG. 22 is a diagram illustrating an example of a sequential processor;

FIG. 24 is a diagram illustrating a problem with the related art (No. 2).

DETAILED DESCRIPTION

Figure 1:
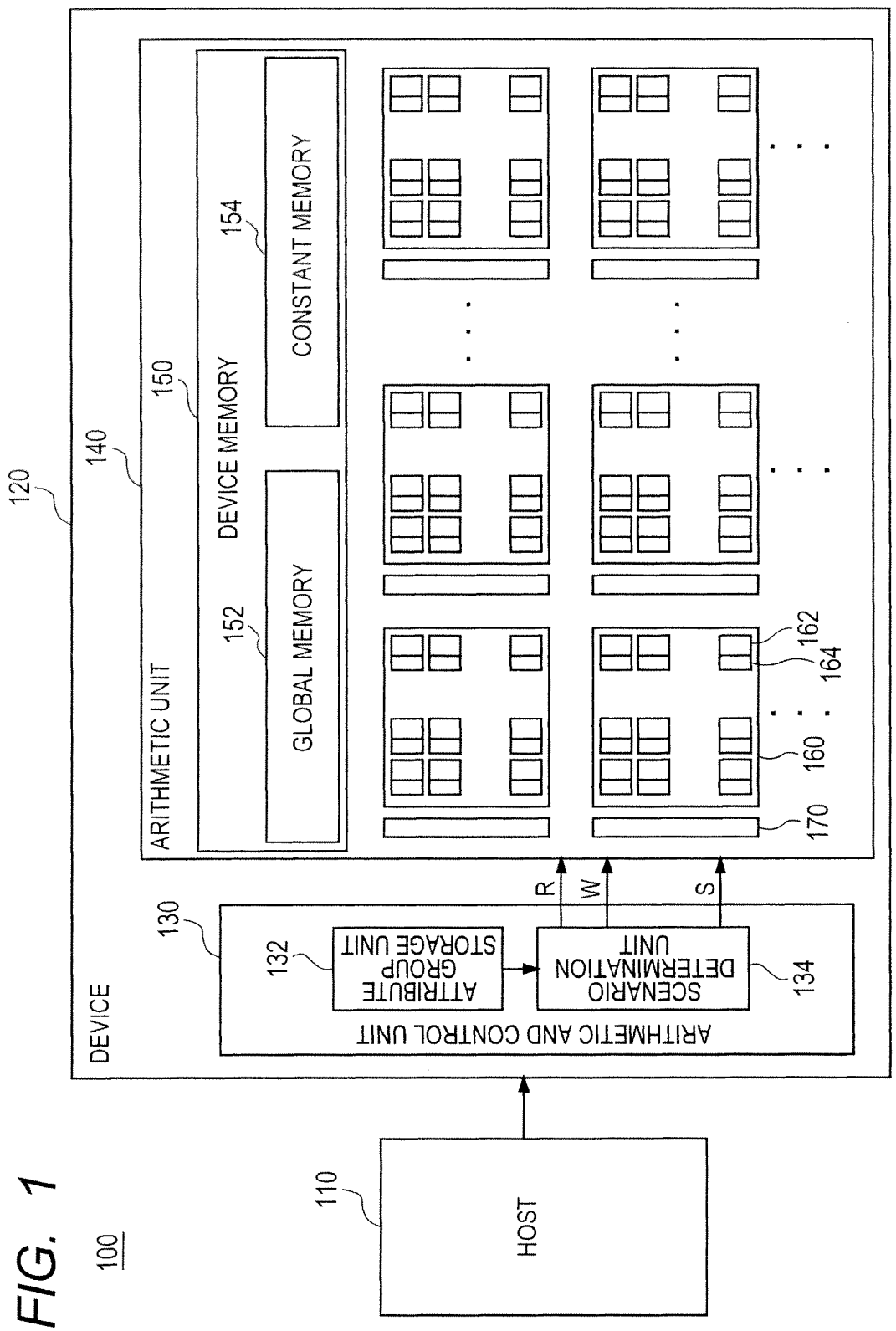
FIG. 1 is a diagram illustrating an OpenCL system according to an embodiment of the present invention.

Hereinafter, an embodiment of the present invention will be described with reference to the accompanying drawings.

For clarification of description, the following description and drawings are appropriately omitted and simplified. Also, it would be understood by an ordinary skilled person that the respective elements illustrated in the drawings as functional blocks that conduct various processing can be realized by the combination of hardware and software (program) in various fashions. The elements are not limited to hardware and software. In the respective drawings, identical elements are denoted by the same reference numerals or symbols, and repetitive description will be omitted as the occasion demands.

Also, the above-mentioned program is stored in various types of non-transitory computer readable media, and can be supplied to a computer. The non-transitory computer readable media include various types of tangible storage media. The examples of the non-transitory computer readable media include magnetic recording media (for example, flexible disc, magnetic tape, hard disc drive), magnetooptical recording media (for example, magnetooptical disc), CD-ROM (read only memory) CD-R, CD-R/W, semiconductor memories (for example, mask ROM, PROM (programmable ROM), EPROM (erasable PROM), flash ROM, and RAM (random access memory)). Also, the program may be supplied to the computer by various types of transitory computer readable media. The examples of the transitory computer readable media include electric signals, optical signals, and electromagnetic waves. The transitory computer readable media can supply the program to the computer through wired communication channels such as electric wires or optical fibers, or radio communication channels.

FIG. 1 illustrates an OpenCL system 100 according to an embodiment of the present invention. The OpenCL system 100 includes an OpenCL host (hereinafter referred merely as "host") 110, and an OpenCL device (hereinafter referred to merely as "device") 120.

The device 120 includes an arithmetic and control unit 130, and an arithmetic unit 140. The arithmetic and control unit 130 includes an attribute group storage unit 132 and a scenario determination unit 134. The arithmetic unit 140 includes a device memory 150, a plurality of compute units (CUs) 160, and a local memory 170 disposed for each of the CUs 160.

The device memory 150 includes a global memory 152 and a constant memory 154. Also, each of the CUs 160 includes a plurality of PEs 162, and a private memory 164 disposed for each of the PEs 162.

The global memory 152, the constant memory 154, the CUs 160, the PEs 162, the private memories 164, and the local memories 170 are identical with the same names in the normal OpenCL device, and detailed description will be omitted in the present specification.

When the host 110 allows the device 120 to conduct arithmetic operation, the host 110 transfers a Kernel corresponding to the arithmetic operation having an argument designated by the user to the device 120.

In the device 120, the arithmetic and control unit 130 controls the arithmetic unit 140 on the basis of the Kernel from the host 110. The arithmetic unit 140 conducts arithmetic operation according to a control of the arithmetic and control unit 130 to obtain the arithmetic results. The arithmetic operation conducted by the arithmetic unit 140 is associated with transfer (read transfer) of data to be subjected to arithmetic operation from the device memory 150 to the private memory 164 and the local memory 170 and transfer (write transfer) of data of the arithmetic results to the device memory 150.

Because both of the data to be subjected to arithmetic operation and the data of the arithmetic results are stored in the global memory 152, in the following description, "read transfer" and "write transfer" are conducted between the global memory 152, and the private memories 164 or the local memories 170. When the data to be subjected to the arithmetic operation is also stored in the constant memory 154, it should be understood that "read transfer" also includes transfer from the constant memory 154 to the private memories 164 or the local memories 170.

For facilitation of understanding, the OpenCL system 100 according to this embodiment will be described in detail with reference to a specific example illustrated in FIG. 2. The term "dimension" in the following description corresponds to the dimension of the above-mentioned index space. In the OpenCL, the index space can be designated by three dimensions at a maximum. However, for convenience of the description, two dimensions are exemplified.

Figure 2:
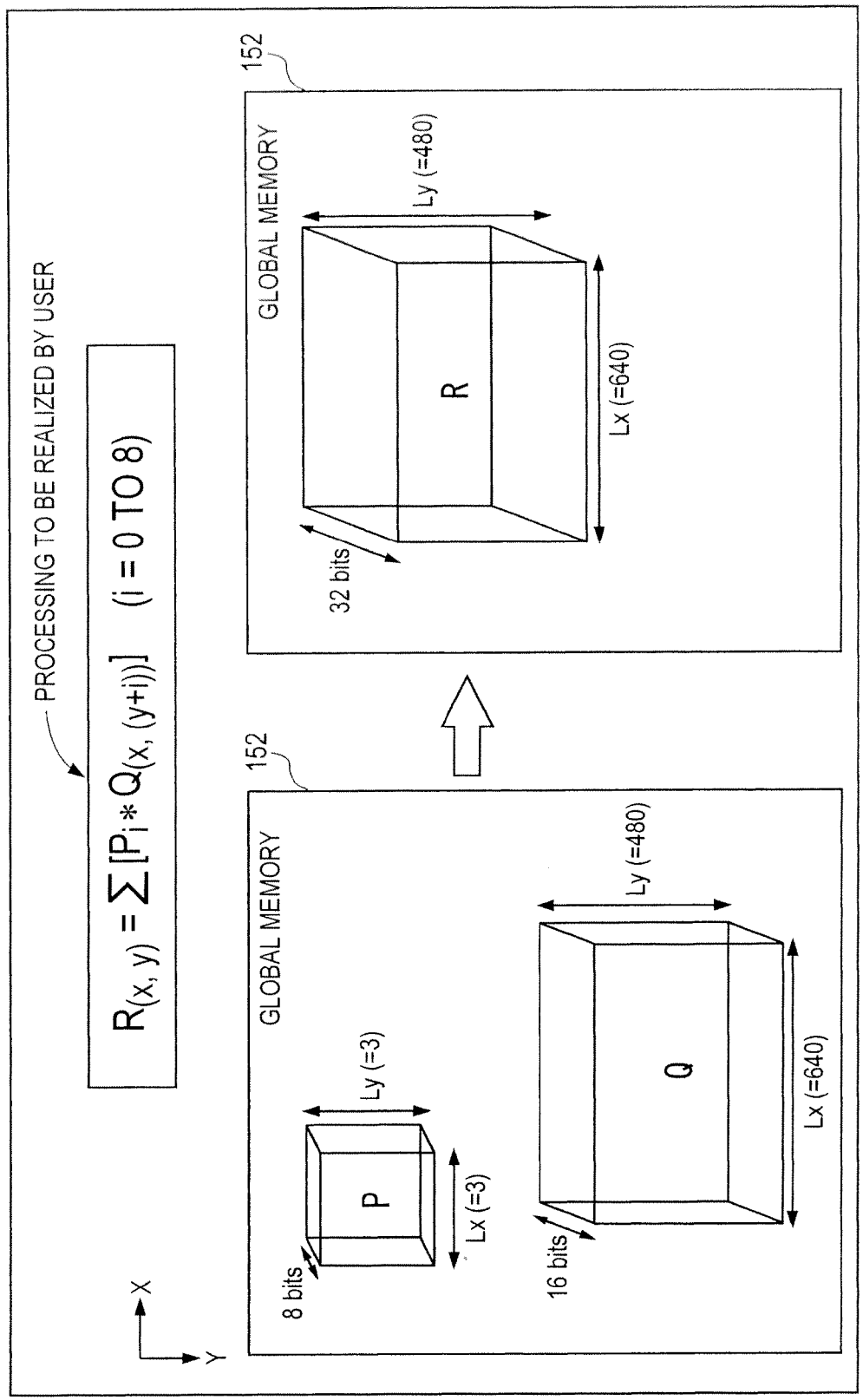
FIG. 2 is a diagram illustrating a specific example of processing to be realized by a user.

As illustrated in FIG. 2, the processing to be realized by the user is represented by Expression (1).

$$R_{(x,y)}\Sigma[P_i * Q_{(x,(y+i))}](i=0 \sim 8) \quad (1)$$

Data to be subjected to the arithmetic operation is included in each of a read block P and a read block Q. Data of the arithmetic results is included in a write block R. In an example illustrated in FIG. 2, the write block is only one write block R.

The Kernel for realizing the processing represented by Expression (1) is naturally created by the user. The creation of the Kernel includes a process of creating a program code (hereinafter referred to as "user designating process") which is executed by each of the PEs 162 of the device 120, and a process of designating the argument.

In the OpenCL system 100 according to this embodiment, the "attribute group" including eight attributes is further supported aside from the respective arguments determined by the OpenCL. Those eight attributes include "size attribute", "read attribute", "write attribute", "margin attribute", "broadcast attribute", "allocation attribute", "hierarchy attribute", and "dependency attribute", and are designated by the user for all of the read blocks and the write blocks as the arguments of the Kernel. In the designation of the attribute, it is not always necessary to designate all of eight attributes.

The eight attributes included in the attribute group are parameters required to be referred to for determining a system (transfer system) which is transferred between the global memory 152, and the private memories 164 and/or the local memories 170. Hereinafter, without a specific description, "transfer" represents transfer between the global memory 152, and the private memories 164 and/or the local memories 170.

The "transfer system" includes the following contents.
(1) Transfer system 1: The presence or absence of division. The transfer system 1 is any one of a system "without division" and a system "with division".

In the read block, "without division" represents that all of the data in the read block is transferred by one read transfer operation, and "with division" represents that the read block is divided into a plurality of sub-read blocks SRB, and only one sub-read block SRB is transferred to one work group by one read transfer operation.

In the write block, "without division" represents that all of the data (arithmetic results) of the write block is transferred to the global memory 152 by one write transfer operation. On the other hand, "with division" represents that the write block is divided into a plurality of sub-write blocks SWB, and only one sub-write block SWB is transferred from one work group by one write transfer operation.

(2) Transfer system: Division system. The transfer system 2 represents that when the data block is divided into a plurality of sub-blocks, how the data block is divided.

(3) Transfer system 3: Division system (associating method of sub-read block SRB). The transfer system 3 is designated when the read block is divided in the above transfer system 1.

That is, if there is a plurality of the read blocks, the distribution system represents how one sub-read block SRB from each read block is distributed to the private memories 164 and the local memories 170, which is transferred by the same read transfer operation. If there is only one read block, the division system equally divides the sub-read block SRB to the private memories 164 and the local memories 170.

(4) Transfer system 4: Integration system (associating method of sub-write block SWB). The transfer system 4 is designated when the write block is divided in the above transfer system 1.

The "integration" represents that data is written in areas allocated in the individual sub-write blocks SWB of the write block in the global memory 152.

If there is a plurality of the write blocks, the integration system represents how the plurality of sub-write blocks SWB stored in the private memory group or the local memories 170, which is transferred by the same write transfer operation, is integrated into the respective write blocks. On the other hand, if there is only one write block, the integration system integrates data in the respective sub-write block SWB of the write block which are stored in the private memory group or the local memories 170 into the above one write block.

The above "transfer system" needs to be designated by the user code in the related art. The user code is complicated because the user code depends on the contents of the arithmetic processing and the configuration of the device 120 (specifically, arithmetic unit 140), which makes extremely difficult to maintain the portability.

Under the above circumstances, as a result of conducting earnest research and seeking, the present inventors have succeeded that the processing that the individual users determine the transfer system in an impromptu manner with spending time in each case while taking the contents of the arithmetic processing and the configuration of the OpenCL device into account is classified into the processing depending on the configuration of the OpenCL device and the processing not depending thereon, and the processing depending on the OpenCL is automatically determined on the basis of a parameter designated by the processing not depending on the OpenCL device and a parameter representing the configuration of the OpenCl device. Thus, the present inventors have established a technique by which a load on developers of the user codes is reduced, and the portability of the user codes is enhanced.

In the OpenCL system 100 according to this embodiment, the processing not depending on the OpenCL device corresponds to the designation of the above attribute group for the data block. The attribute group is a parameter necessary to determine the transfer system, but does not depend on the configuration of the OpenCL device. Hereinafter, the attribute group will be described in detail below. Hereinafter, that each attribute "is necessary to determine the transfer system, but does not depend on the configuration of the OpenCL device" is not repetitively described, but only the other elements will be described.

The above eight attributes are further classified into three kinds of "specific attribute", "arithmetic attribute", and "policy attribute". The attributes will be described with reference to the example of the respective data blocks illustrated in FIG. 2.

The specific attribute is provided in the data block regardless of the contents of the arithmetic processing and the user's intention. In this embodiment, "specific attribute" is the following "size attribute".

<Size Attribute> This attribute is a parameter indicative of the size of the data block, which is, for example, the number of words for each dimension, and the number of bytes or the number of bits for each word. This attribute is always designated for all of the data blocks.

For that reason, the size attributes of the read block P, the read block Q, and the write block R illustrated in FIG. 2 are represented as follows.

The read block P is a two-dimensional data block, and each of an X-directional size Lx and a Y-directional size Ly is 3 words. In the read block P, the number of bits for one word is 8 bits. For that reason, as the size attribute, "X-directional size Lx: 3, Y-directional size Ly: 3, the number of bits/word: 8" is designated for the read block P.

Likewise, "X-directional size Lx: 640, Y-directional size Ly: 480, the number of bits/word: 16" is designated for the read block Q.

Also, "X-directional size Lx: 640, Y-directional size Ly: 480, the number of bits/word: 32" is designated for the write block R.

The "arithmetic attribute" is irrelevant to the user's intention, but relevant to the contents of the arithmetic processing. In this embodiment, the "arithmetic attribute" includes the following "read attribute" and "write attribute". The arithmetic attribute is designated assuming that each data block is divided into one or more sub-blocks. In the write block, it is further assumed that the read block has already been located on the private memory group or the local memories 22. That the data block is divided into one sub-block means no division.

<Read Attribute> This attribute first indicates whether the data block is data to be subjected to arithmetic processing (that is, read-transferred data), or not, and a transfer order when data is subjected to arithmetic operation. The transfer order is a parameter for designating in what order the respective sub-blocks of the data block are transferred.

The write block is not read-transferred, and therefore is designated with "none" indicating that no data is read-transferred. The read block is a data block to be read-transferred, and therefore designated with the transfer order as "read-transferred".

In the OpenCL system 100 according to this embodiment, the transfer order set as the read attribute can be designated with "top left", "bottom right", and "random". Only when "random" is designated, a pointer is separately designated in an area where information indicative of the transfer order is stored.

Figure 3:
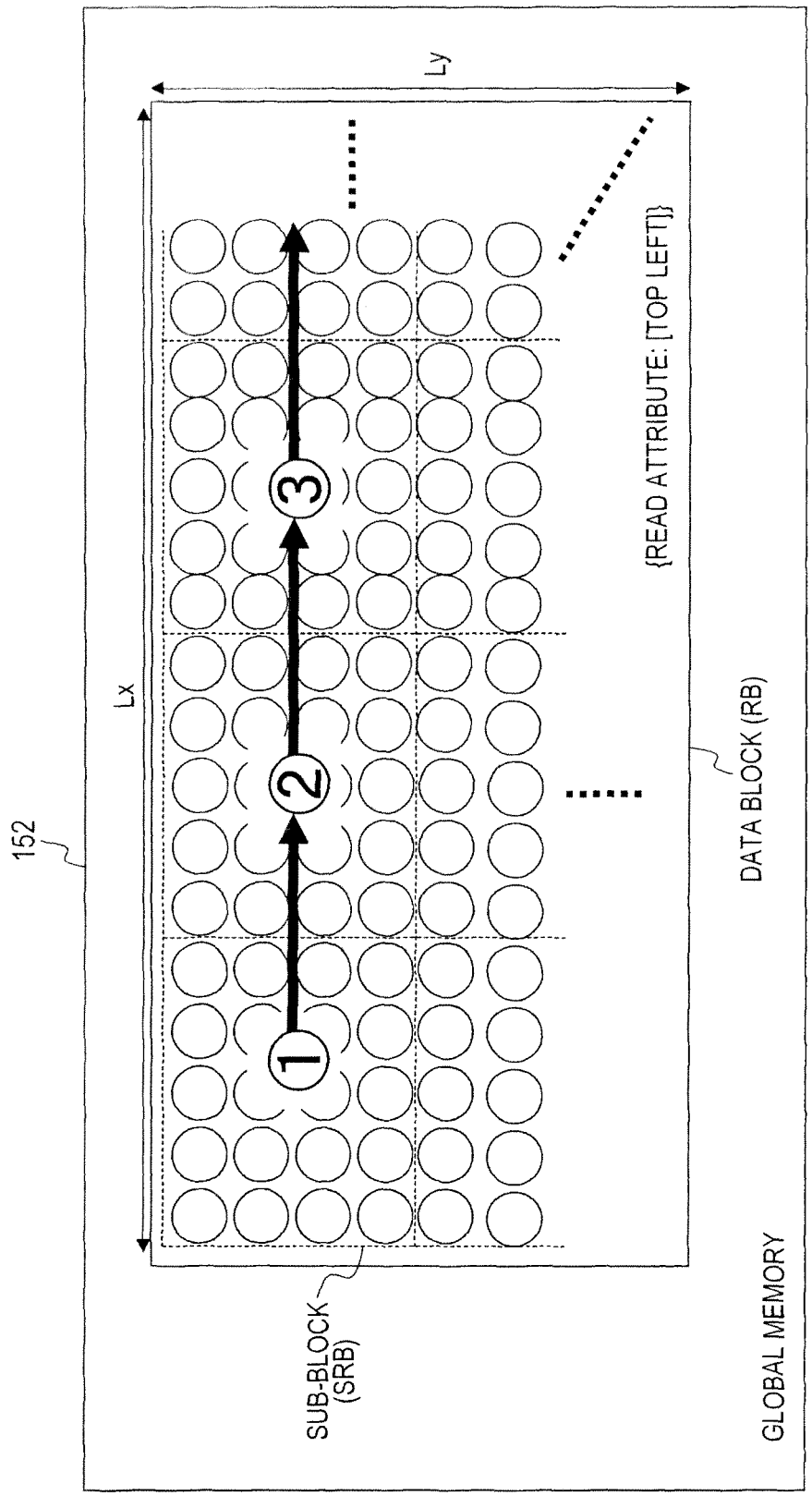
FIG. 3 is a diagram illustrating a read attribute.

The "top left" represents transfer from the sub-block on the top left, and "bottom right" represents transfer from the sub-block on bottom right. FIG. 3 represents the transfer order of the sub-block when the "top left" is designated as the read attribute.

As illustrated in FIG. 3, in this case, the data block (read block) stored in the global memory 152 are a sub-block 1 on the top left, a sub-block 2 right adjacent to the sub-block 1, a sub-block 3 right adjacent to the sub-block 2, . . . in the transfer order.

The read attributes of the respective data blocks illustrated in FIG. 2 will be described. The read block P and the read block Q are designated to "top left" in the transfer order as the read attribute on the basis of the contents of the arithmetic processing illustrated in Expression (1) because of data to be read-transferred.

On the other hand, the write block R is designated to "none" in the read attribute because of no data to be read-transferred.

<Write Attribute> This attribute first indicates whether the data block is data of the arithmetic results (that is, data to be write-transferred), or not, and the transfer order when the data block is the data of the arithmetic results. The transfer order is a parameter for designating in what order the respective sub-write blocks SWB are transferred.

The read block is not write-transferred, and therefore is designated with "none" indicating that no data is write-transferred. The write block is a data block to be write-transferred, and therefore designated with the transfer order as "write-transferred".

In the OpenCL system 100 according to this embodiment, the transfer order set as the write attributes can be designated with "top left", "bottom right", and "random". Only when "random" is designated, a pointer is separately designated in an area where information indicative of the transfer order is stored.

The read block is not write-transferred, and therefore is designated with "NONE" indicating that no data is write-transferred. For that reason, the read block P and the read block Q illustrated in FIG. 2 are designated with "none" as the write attribute.

The write block is a data block to be write-transferred, and therefore designated with the transfer order as "write-transferred". The transfer order is a parameter for designating in what order the respective sub-blocks of the data block are transferred.

In the OpenCL system 100 according to this embodiment, the transfer order set as the write attributes can be designated with "top left", "bottom right", and "random" as with the transfer order set as the read attributes. Only when "random" is designated, a pointer is separately designated in an area where information indicative of the transfer order is stored.

The significances of the respective parameters of the transfer order set as the write attributes are identical with those of the corresponding parameters of the transfer order set as the read attributes, and therefore a detailed description thereof will be omitted.

The write attributes of the respective data block will be described. The write block R is designated to "top left" in the transfer order as the read attribute on the basis of the contents of the arithmetic processing illustrated in Expression (1) because of data to be write-transferred.

On the other hand, the read block P and the read block Q are designated to "none" in the write attribute because of no data to be write-transferred.

The "policy attribute" is an attribute relevant to the contents of the arithmetic processing and the user's intention of how to execute the transfer and the arithmetic processing. In the OpenCL system 100 according to this embodiment, the "policy attribute" includes "margin attribute", "broadcast attribute", "allocation attribute", "hierarchy attribute", and "dependency attribute". The policy attribute is also designated assuming that each data block is divided into one or more sub-blocks. In the write block, it is further assumed that the write block has already been located on the private memory 20 or the local memories 22. That the data block is divided into one sub-block means no division.

<Margin Attribute> This attribute is a parameter for the read block, which is indicative of the amount of data other than the sub-read block SRB adjacent to a boundary of the sub-read block SRB, which is transferred together with data within the sub-read block SRB. Also, the margin attribute is designated for each of the dimensions. A unit of the parameter of the margin attribute is a word.

In the write block, no margin attribute cannot be designated, or is ignored even if the margin attribute is designated.

Figure 4:
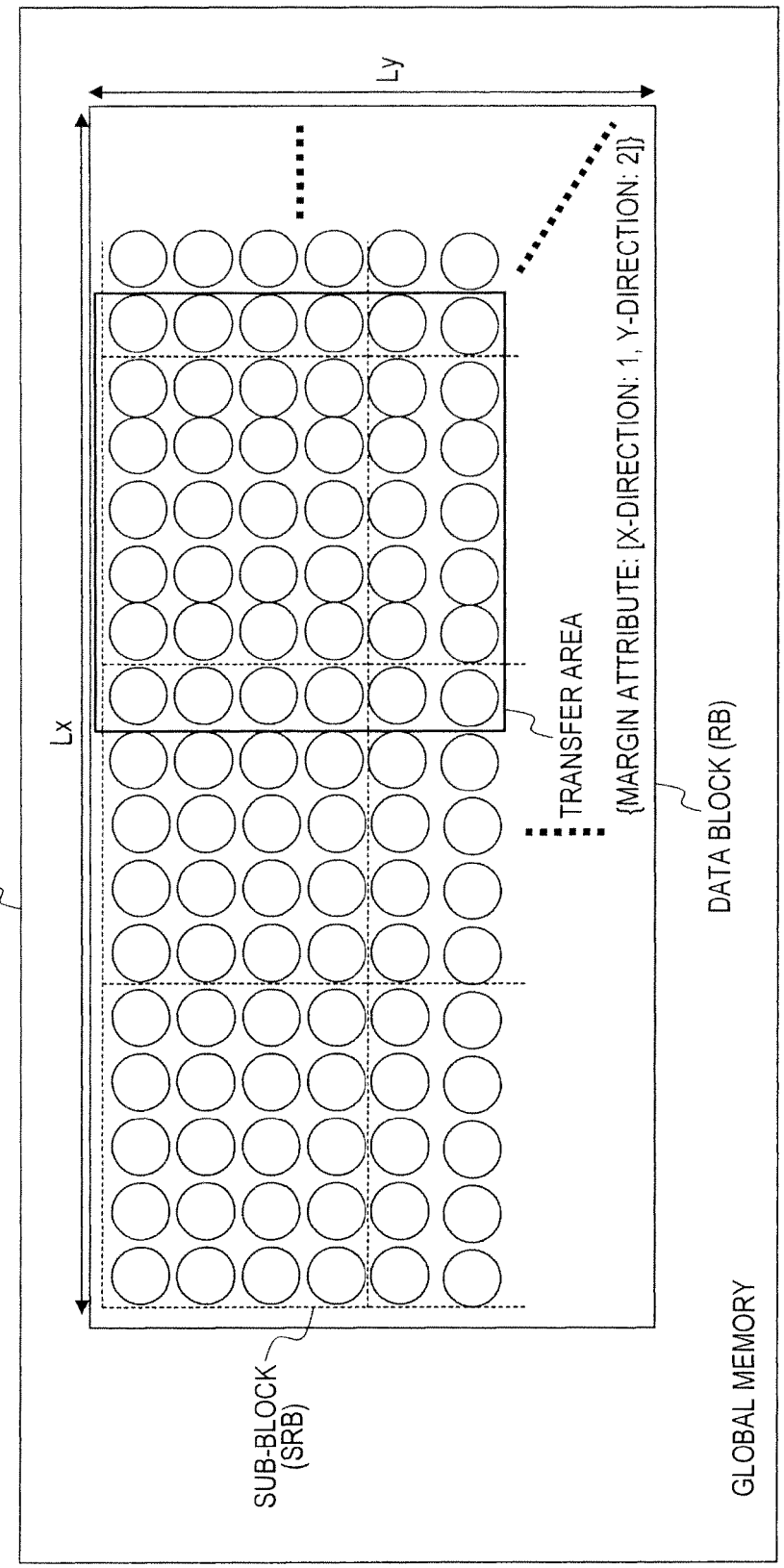
FIG. 4 is a diagram illustrating a margin attribute.

FIG. 4 illustrates a transfer range at the time of transferring the respective sub-read blocks SRB of the data block (read block) when "1" is designated in the X-direction and "2" is designated in the Y-direction as the margin attribute. In this case, the transfer range at the time of transferring the sub-load block SRB includes data within the sub-read block SRB, as well as data on one column adjacent to a boundary on each of right and left sides of the sub-read block SRB, and data on two rows adjacent to a boundary on each of the upper and lower ends. FIG. 4 exemplifies the sub-read block SRB located on an upper end of the data block. In this example, because there is no data adjacent to the boundary on the upper end of the sub-read block SRB, the transfer range at the time of transferring the sub-read block SRB includes no data adjacent to the boundary on the upper end.

Although will be described in detail later, in each of the read blocks, one sub-read block SRB is transferred to one CU 160 during one read transfer operation, and arithmetic operation is conducted by the CU 160 on the sub-read block SRB of each sub-block. The results of arithmetic operation are transferred to the global memory from the CU 160.

For example, when convolution operation of 3×3 is conducted on a two-dimensional image, a target pixel and one pixel adjacent to the target pixel in each of four up, down, right and left directions are required. If only data within the sub-read block SRB is transferred, arithmetic operation cannot be conducted on each pixel located on the outermost side of the sub-read block SRB. For that reason, in this case, it is necessary to designate "1" in both of the X-direction and the Y-direction as the margin attribute.

The margin attributes of the respective data blocks illustrated in FIG. 2 will be described. The designation of the margin attribute is relevant to the designation of the other attributes, and therefore only the description of the margin attribute is difficult. For that reason, in this example, only values of the margin attribute designated for the respective data blocks illustrated in FIG. 2 are illustrated, and the details of those significances will be described later.

The read block P and the read block Q are subjected to the designation of the margin attribute, but, in the read block P, the margin is set to "0" in each of the X-direction and the Y-direction. Also, in the read block Q, the margin in the X-direction is designated to "0", and the margin in the Y-direction is designated to "9".

Accordingly, at the time of transferring the read block P, only data within the sub-read block SRB is transferred. On the other hand, at the time of transferring the read block Q, data on nine lines adjacent to the lower end of the sub-read block SRB are also transferred in addition to data within the sub-read block SRB.

The write block R is data to be write-transferred, and therefore is not subjected to the designation of the margin attribute. That is, at the time of transferring the write block R, only data within the sub-write block SWB is transferred.

Figure 5:
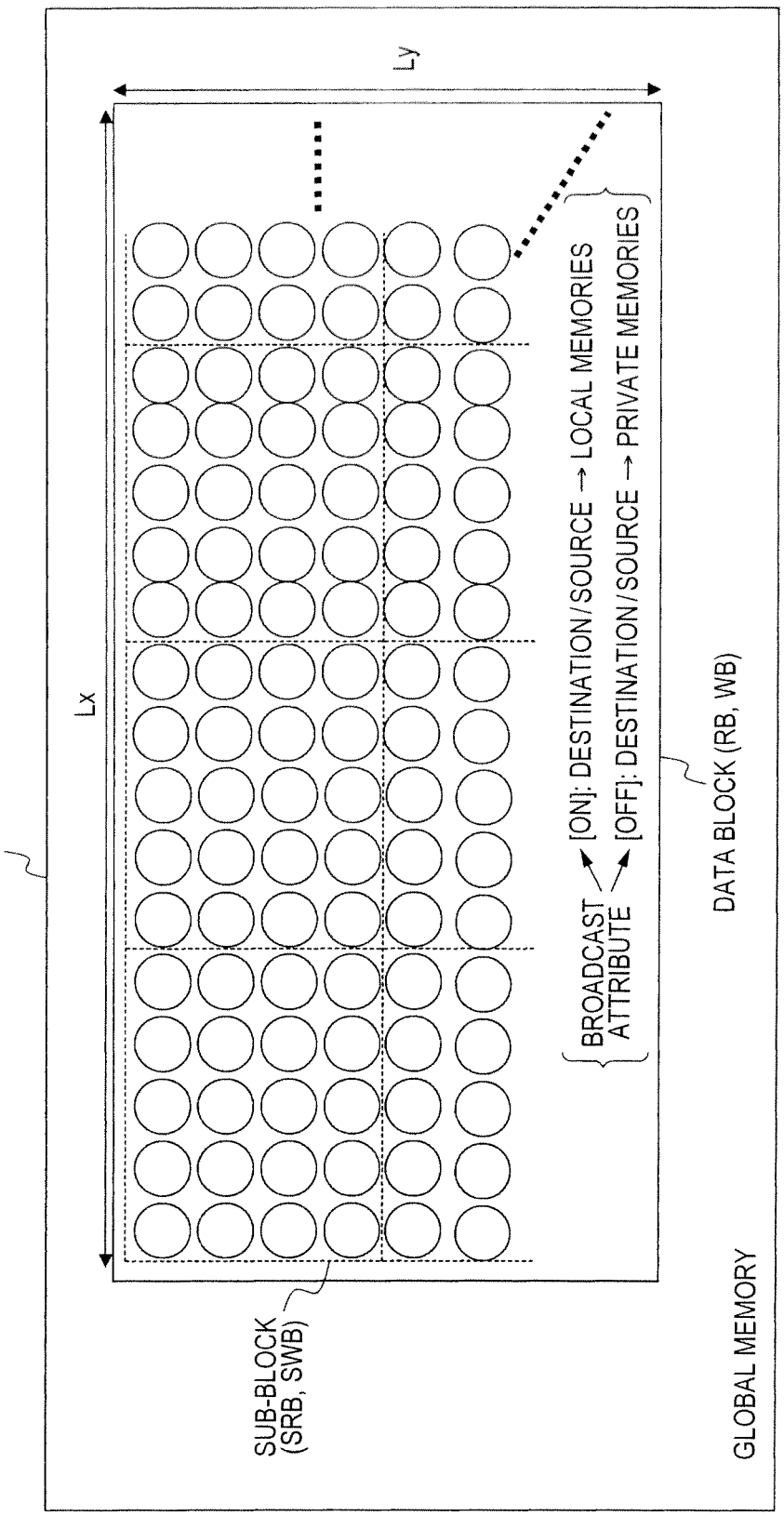
FIG. 5 is a diagram illustrating a broadcast attribute.

<Broadcast Attribute> This attribute is a parameter for designating which of the private memory and the local memory is a destination of the sub-read block SRB in each of the read blocks and a destination of the sub-write block SWB in each of the write blocks, and is any one of "on" and "off". For example, as illustrated in FIG. 5, "on" of the broadcast attribute designates the local memory as the destination or a source, and "off" of the broadcast attribute designates the private memory as the destination or the source.

The broadcast attributes of the respective data blocks illustrated in FIG. 2 will be described. The designation of the broadcast attribute is also relevant to the other attributes, and therefore the description of only the broadcast attribute is difficult. For that reason, in this example, only values of the broadcast attributes designated for the respective data blocks illustrated in FIG. 2 are illustrated, and the details of those significances will be described later.

In the read block P, the broadcast attribute is designated to "on". For that reason, at the time of transferring the read block P, the respective sub-read blocks SRB are transferred to the local memories 170.

In the read block Q and the write block R, the broadcast attribute is designated to "off". For that reason, at the time of transferring the read block Q, the respective sub-read blocks SRB are transferred to the private memories 164. Also, the sub-write blocks SWB of the write block R are transferred to the global memory 152 from the private memory group.

<Allocation Attribute> This attribute is a parameter representative of an allocation system of how the sub-read blocks SRB and the sub-write blocks SWB are allocated to the private memory group or the local memories of the CUs 160.

In the OpenCL system 100 according to this embodiment, two allocation systems of "vertical priority" and "horizontal priority" are supported.

Before the allocation attribute will be described in detail, a work group size WGs and the amount of data to be allocated to one item will be first described.

The "work group size WGs" corresponding to the data block in which the broadcast attribute is "off" is the amount of data represented by the number of items in one working group, and if the number of items is, for example, N, the work group size WGs becomes N words. On the other hand, the work group size WGs corresponding to the data block in which the broadcast attribute is "on" is always regarded as 1. In the following description, the "work group size WGs" corresponding to the data block in which the broadcast attribute is "off" is merely called "work group size WGs". The work group size WGs is determined according to the scenario determination unit 134 of the arithmetic and control unit 130 in the device 120 later. However, the user can designate any one of the maximum value and the minimum value of the work group size WGs at the time of creating the Kernel.

Also, the amount of data to be allocated to one item is also determined by the scenario determination unit 134 later. When the work group size WGs is the minimum value, one item corresponds to 1 PE. On the contrary, in the case of the OpenCL device in which the private memory of the PE is divided into M pieces (M: integer of 2 or more), and M items are made to correspond to 1 PE so that the work group size WGs can be designated M times larger than the former at a maximum, the maximum value becomes M times larger than the minimum value. On the other hand, if the work group size WGs of the maximum value is used, the private memory per 1 PE is merely 1/M of a case where the work group size WGs of the minimum value is used. Hereinafter, for simplification of description, the scenario determination unit 134 always employs the minimum value as the work group size WGs, as a result of which one item corresponds to 1 PE. Therefore, in the following description, the item is expressed as PE.

The "vertical priority" is a system in which the size (SBsx) of the sub-block in the X-direction is the work group size WGs, and the data block is allocated so that the size in the Y-direction is the amount of data to be allocated to one item, that is, the amount of data to be allocated to 1 PE.

The respective sub-blocks within the data block in which the "vertical priority" is designated as the allocation attribute are transferred between the global memory 152 and the private memories 164, so that one sub-block corresponds to one work group, and data on one column within the sub-block corresponds to the private memory 164 of one PE 162 within the work group.

Figure 6:
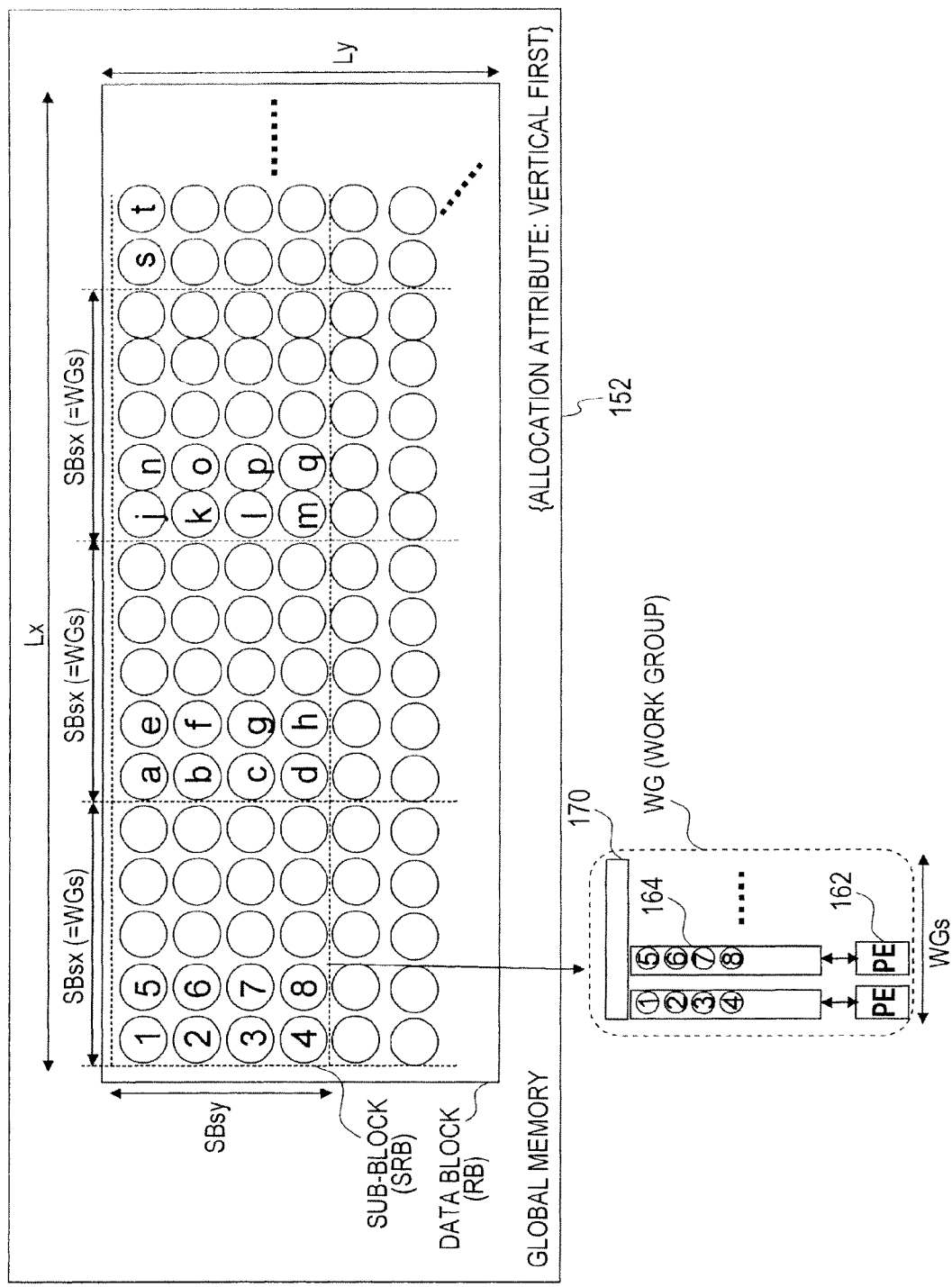
FIG. 6 is a diagram illustrating an allocation attribute (No. 1)

FIG. 6 illustrates an example of the read block in which the "vertical priority" is designated as the allocation attribute. In this case, the respective sub-read blocks SRB are transferred from the global memory 152 to the private memories 164, so that all of the data within each sub-read block SRB is stored in the private memories 164 of the PEs 162 within the same work group, and data on the same column within the sub-block is stored in the private memory 164 of the same PE 162.

The "horizontal priority" is a system for dividing the data block so that a size SBsx of the sub-block in the X-direction becomes the integral multiple of the work group size WGs. An SBsy of the sub-block in the Y-direction is determined by the scenario determination unit 134 later.

Each of the sub-blocks within the data block in which the "horizontal priority" is designated as the allocation attribute corresponds to one work group, and all of the data within each sub-block is transferred to the private memories 164 of the PEs 162 included in the same work group. Further, data of integral separation blocks obtained by separating each row of the sub-block for every amount of work group size WGs is evenly distributed to the private memories 164 of the WGs PEs 162 within the work group for each separation block.

Figure 7:
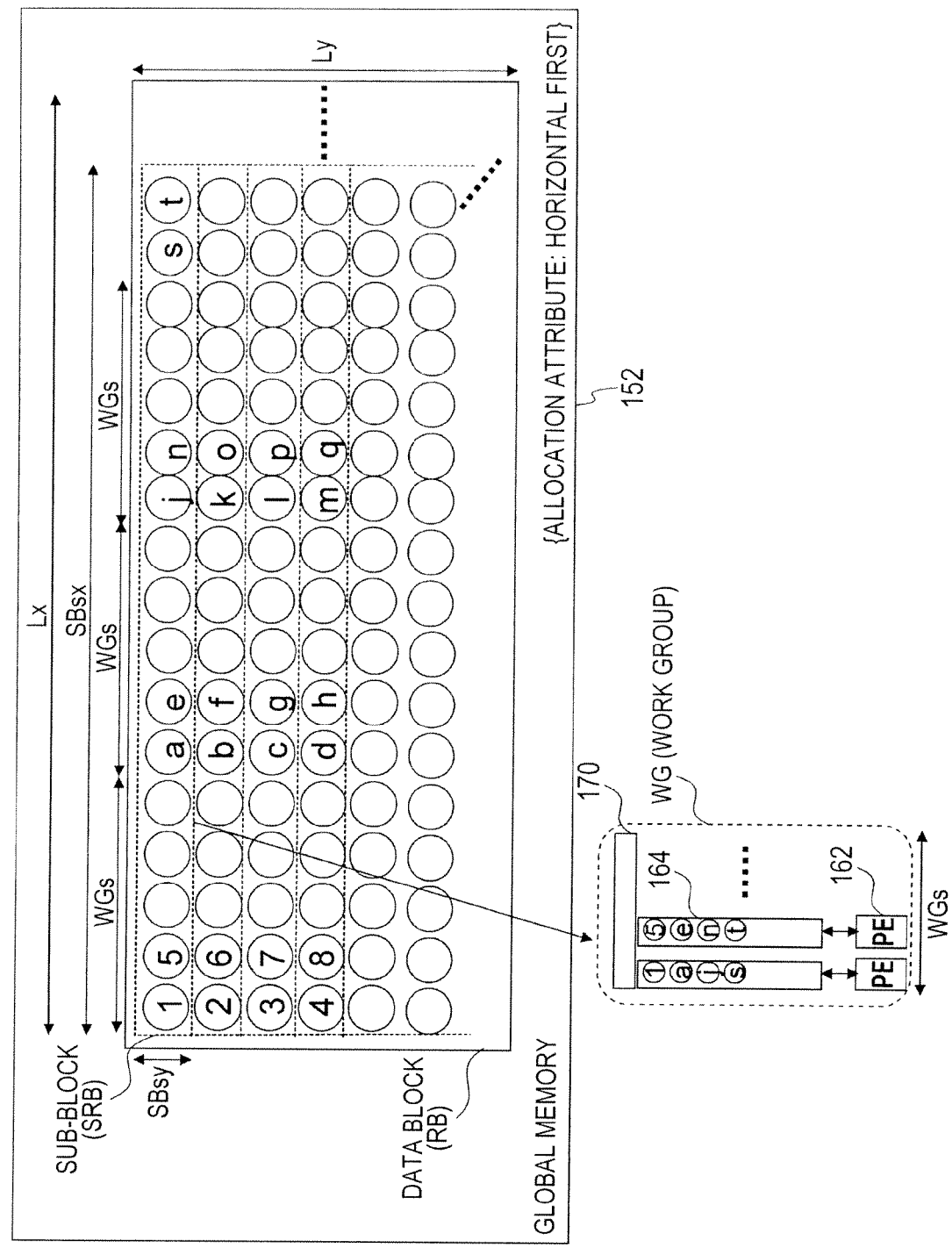
FIG. 7 is a diagram illustrating an allocation attribute (No. 2)

FIG. 7 illustrates an example of the read block in which the "horizontal priority" is designated as the allocation attribute. In this example, it is assumed that the size SBsy of the sub-write blocks SWB in the Y-direction is one word. That is, the read block is divided so that the size SBsx of the sub-read block SRB in the X-direction becomes the integral multiple of the work group size WGs, and the number of rows is 1.

As illustrated in the figure, in this case, the respective sub-read blocks SRB are transferred from the global memory 152 to the private memories 164, so that all of the data within each sub-read block SRB is stored in the private memories 164 of the PEs 162 within the same work group. Further, data of integral separation blocks obtained by separating the sub-read block SRB for every amount of work group size WGs in rows is so transferred as to be evenly distributed to the private memories 164 of the WGs PEs 162 within the work group for each separation block. For example, plural pieces of data from data 1 to data before data a configures one separation block, and is so transferred as to be stored in the respective private memories 164 of the plural PEs 162 in the same work group. Also, plural pieces of data from the data a to data before data j also configure one separation block, and is so transferred as to be stored in the respective private memories 164 of the plural PEs 162 in the work group.

The allocation attributes of the respective data blocks illustrated in FIG. 2 will be described. The designation of the allocation attribute is also relevant to the other attributes, and therefore the description of only the allocation attribute is difficult. For that reason, in this example, only values of the allocation attributes designated for the respective data blocks illustrated in FIG. 2 are illustrated, and the details of those significances will be described later.

In the read block P, it is assumed that the "vertical priority" is designated as the allocation attribute.

Similarly, in the read block Q and the write block R, it is assumed that the allocation attribute is designated to "vertical priority".

<Hierarchy Attribute> This attribute is the number of hierarchy designated by a natural number of 1 or more. In the plural read blocks in which the same number of hierarchies are designated, each sub-block SB is transferred by one read or write transfer operation.

The hierarchies of the respective data blocks illustrated in FIG. 2 will be described. The designation of the hierarchy attribute is also relevant to the other attributes, and therefore the description of only the hierarchy attribute is difficult. For that reason, in this example, only values of the hierarchy attributes designated for the respective data blocks illustrated in FIG. 2 are illustrated, and the details of those significances will be described later.

In the read block P and the read block Q, the respective hierarchy attributes are designated to "2" and "1". Also, the hierarchy attribute of the write block R is designated to "1".

<Dependency Attribute> This attribute is a parameter representative of a data dependency relationship between the sub-block and eight other sub-blocks for the data block, and can designate "with dependency" and "without dependency". Also, in "with dependency", three kinds of dependency relationships can be further designated.

Figure 8:
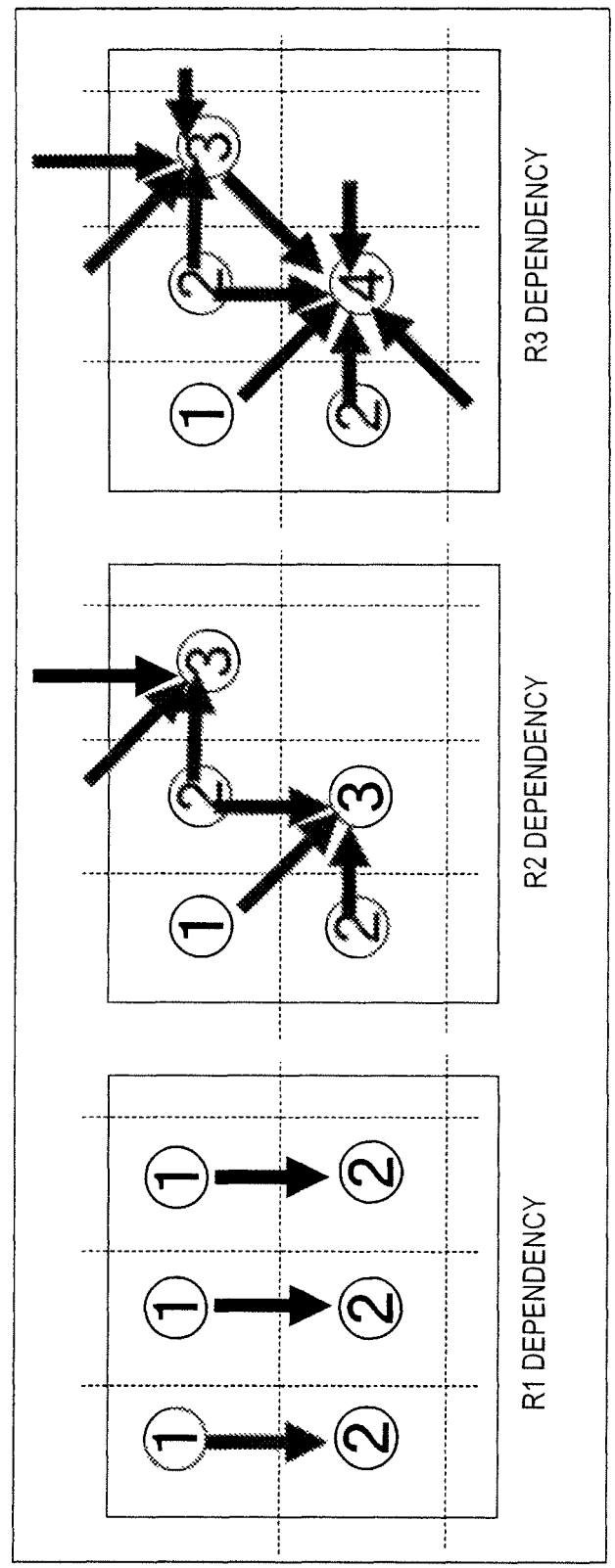
FIG. 8 is a diagram illustrating a dependency attribute.

The "with dependency" has three kinds of R1 type, R2 type, and R3 type. The dependency relationships will be described with reference to FIG. 8. Referring to FIG. 8, frames surrounded by dotted lines indicate the sub-blocks SB, and numbers indicate the transfer order.

FIG. 8 illustrates the R1 to R3 dependency relationships when the allocation attribute and the read attribution are designated to "vertical priority" and "top left", respectively.

As illustrated in the figure, in this case, the "R1 dependency" is designated when a target sub-block SB has the dependency relationship with a top sub-block SB. The "R2 dependency" is designated when the target sub-block SB has the dependency relationship with the top, top left, and left sub-blocks SB. Also, the "R3 dependency" is designated when the target sub-block SB has the dependency relationship with six sub-blocks SB except for two bottom and bottom right sub-blocks among eight adjacent sub-blocks SB.

The dependency attributes of the data blocks exemplified in FIG. 2 will be described. The designation of the dependency attributes is also relevant to the other attributes, and therefore the description of only the dependency attribute is difficult. For that reason, in this example, only values of the dependency attributes designated for the respective data blocks illustrated in FIG. 2 are illustrated, and the details of those significances will be described later.

In the example, in all of the read block P, the read block Q, and the write block R, the dependency attributes are designated to "none".

Figure 9:
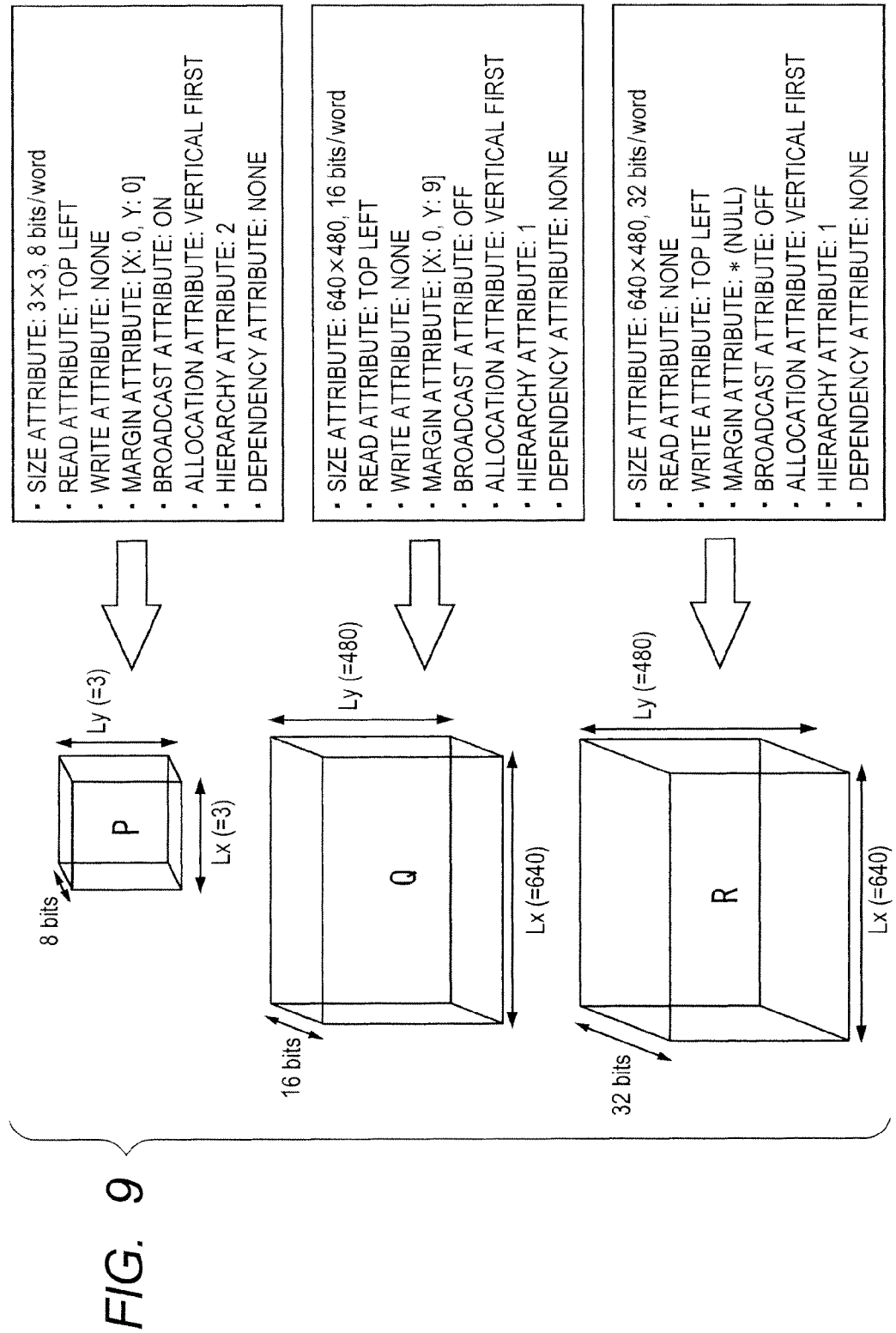
FIG. 9 is a diagram illustrating examples of the attribute group set for each data block illustrated in FIG. 2.

The eight attributes supported by the OpenCL system 100 according to this embodiment are described above. None of those eight attributes depends on the configuration of the arithmetic unit 140 in the device 120. For facilitation of understanding the subsequent description, the respective attribute groups set for three data blocks illustrated in FIG. 2 are illustrated in FIG. 9 in a lump.

In the OpenCL system 100 according to this embodiment, the argument of the Kernel transferred from the host 110 to the device 120 includes the above attribute groups designated for the respective data blocks of the arithmetic subject and the arithmetic results. The attribute group storage unit 132 in the arithmetic and control unit 130 of the device 120 store those respective attribute groups therein, and supplies the attribute groups to the scenario determination unit 134.

The scenario determination unit 134 determines a transfer scenario (hereinafter also referred to simply as "scenario") to be described later, on the basis of the respective attribute groups stored in the attribute group storage unit 132, and also controls the arithmetic operation by the arithmetic unit 140 and the transfer of data associated with the arithmetic operation on the basis of the determined scenario. The scenario determination unit 134 repetitively transmits an instruction set to the arithmetic unit 140 in conducting the above control. The instruction set includes a read transfer instruction R, an arithmetic execution instruction S, and a write transfer instruction W. Also, one transmission of the instruction set represents that the read transfer instruction R, the arithmetic execution instruction S, and the write transfer instruction W are transmitted in the stated order.

In the arithmetic unit 140, the read transfer is conducted according to the read transfer instruction R from the arithmetic and control unit 130.

Subsequently, the arithmetic processing is conducted on the data stored in the private memories 164 or the local memories 170 by the read transfer responsive to the read transfer instruction R, by the PEs 162 of the arithmetic unit 140, in response to the arithmetic execution instruction S from the arithmetic and control unit 130. The respective data that is the arithmetic results is stored in the private memories 164 or the local memories 170 corresponding to the respective PEs 162.

Then, the data (arithmetic results) stored in the private memories 164 or the local memories 170 is transferred to the global memory 152 by the write transfer in response to the write transfer instruction W from the arithmetic and control unit 130.

Now, a process of determining the scenario by the scenario determination unit 134 will be described. The scenario determination unit 134 determines the scenario on the basis of the respective attribute groups stored in the attribute group storage unit 132 and the parameters representative of the configuration of the arithmetic unit 140. This scenario corresponds to the transfer system.

The operation of the scenario determination unit 134 will be described. In the description, the example illustrated in FIG. 2 is referred to for the arithmetic processing and the data blocks. It is assumed that, in the respective data blocks illustrated in FIG. 2, the attribute groups are set as illustrated in FIG. 9, and stored in the attribute group storage unit 132. The example of the parameters representative of the configuration of the arithmetic unit 140 is illustrated in FIG. 10.

Also, in the above description of the respective attributes, for facilitation of understanding, it is assumed that one item corresponds to 1 PE. On the other hand, in the following description, it is assumed that 1 PE can correspond to one or more items.

The scenario determination unit 134 determines the transfer system in conformity to the following rule, and controls the arithmetic processing depending on the determined transfer system.

<Rule 1> The scenario determination unit 134 first sets a common work groups size WGs for all of the data blocks, and determines the division size of the data blocks and the number of iterations so that a plurality of data blocks having the same hierarchy attribute are divided into the sub-blocks by the common number of divisions.

The "division size" represents the size of the sub-blocks, and "the number of divisions" represents the number of sub-blocks obtained by dividing one data block. When "the number of divisions" is 1, it means that there is no division. Also, "the number of iterations" represents the number of transfers necessary to transfer all of the sub-blocks in the data block.

The size of the data block, the division size, the number of divisions, the work group size WGs, and the number of iterations have relationships expressed by the following Expressions (2) to (5).

$$\text{Size of data block} = X\text{-direction size } Lx \times Y\text{-direction size } Ly \quad (2)$$

$$\text{Division size} = X\text{-direction size } SBsx \times Y\text{-direction size } SBsy \text{ of sub-block} \quad (3)$$

$$\text{The number of divisions} = \text{data block size}/(\text{division size} \times \text{work group size WGs}) \quad (4)$$

$$\text{The number of iterations} = \{\text{the number of divisions} \times (X\text{-direction size } Lx/\text{work group size WGs})\}/\text{the number of WG} \quad (5)$$

The scenario determination unit 134 determines the work group size WGs and the division size (precisely, Y-direction size SBsy of the sub-block) so that a sum of the division size and a total amount of the margins when the margin attribute is designated ("0" when the margin attribute is not designated) does not exceed a total value of available capacities of the private memories of the individual items, and the data blocks having the same hierarchy attributes, and a restriction that the data blocks having the same hierarchy attribute are divided by the same number of divisions is satisfied, with respect to the data blocks (read blocks) in which the read attribute is not "none", or the data blocks (write blocks) in which the write attribute is not "none" among the data blocks in which the broadcast attribute is "off". Under the assumption of the above restrictions, if there is a suggested work group size WGs of the target OpenCL device, the suggested work group size WGs is applied, and if an upper limit and a lower limit of the work group size WGs are determined, the work group size WGs is determined within a range determined by the upper limit and the lower limit.

<Rule 2> Each of the sub-read block SRB groups including the corresponding sub-read blocks SRB of the read blocks having the same hierarchy attribute is transferred to the private memories or the local memory spaces at the same time, and a user designating process starts. If the margin is designated by the margin attribute for the sub-read blocks SRB to be transferred, data of the margin is also transferred.

<Rule 3> After the sub-read block SRB group of the corresponding sub-read blocks SRB has been transferred to the private memories or the local memory section by the number of times that are multiplication of the number of divisions of the data blocks different in the hierarchy attribute, the user designating process starts.

For example, when it is assumed that the number of divisions of the read blocks in which the hierarchy attribute is "1" is N, and the number of divisions of the read blocks in which the hierarchy attribute is "2" is M, the scenario determination unit 134 operates to call the user designating process by N×M times. Also, prior to each calling, one kind of combination of the sub-read blocks SRB is transferred to the private memories or the local memory sections.

The scenario determination unit 134 determines the associating method of the sub-blocks (the distribution system and the integration system in the above-mentioned transfer system), and then transfers the sub-blocks. As illustrated in FIG. 12, the method of associating between the sub-blocks of the data blocks having the same hierarchy is different from the method of associating between the sub-blocks of the data blocks having the different hierarchies.

<Rule 4> After each user designating process has started, the sub-write blocks SWB that are the results of the arithmetic processing are transferred to the global memory sections. The transfer of the sub-write blocks SWB is identical with that of the sub-read blocks SRB, except that the transfer are conducted after the user designating process has started, and the transfer direction is "from the private memories and/or the local memory spaces to the global memory spaces".

Figure 11:
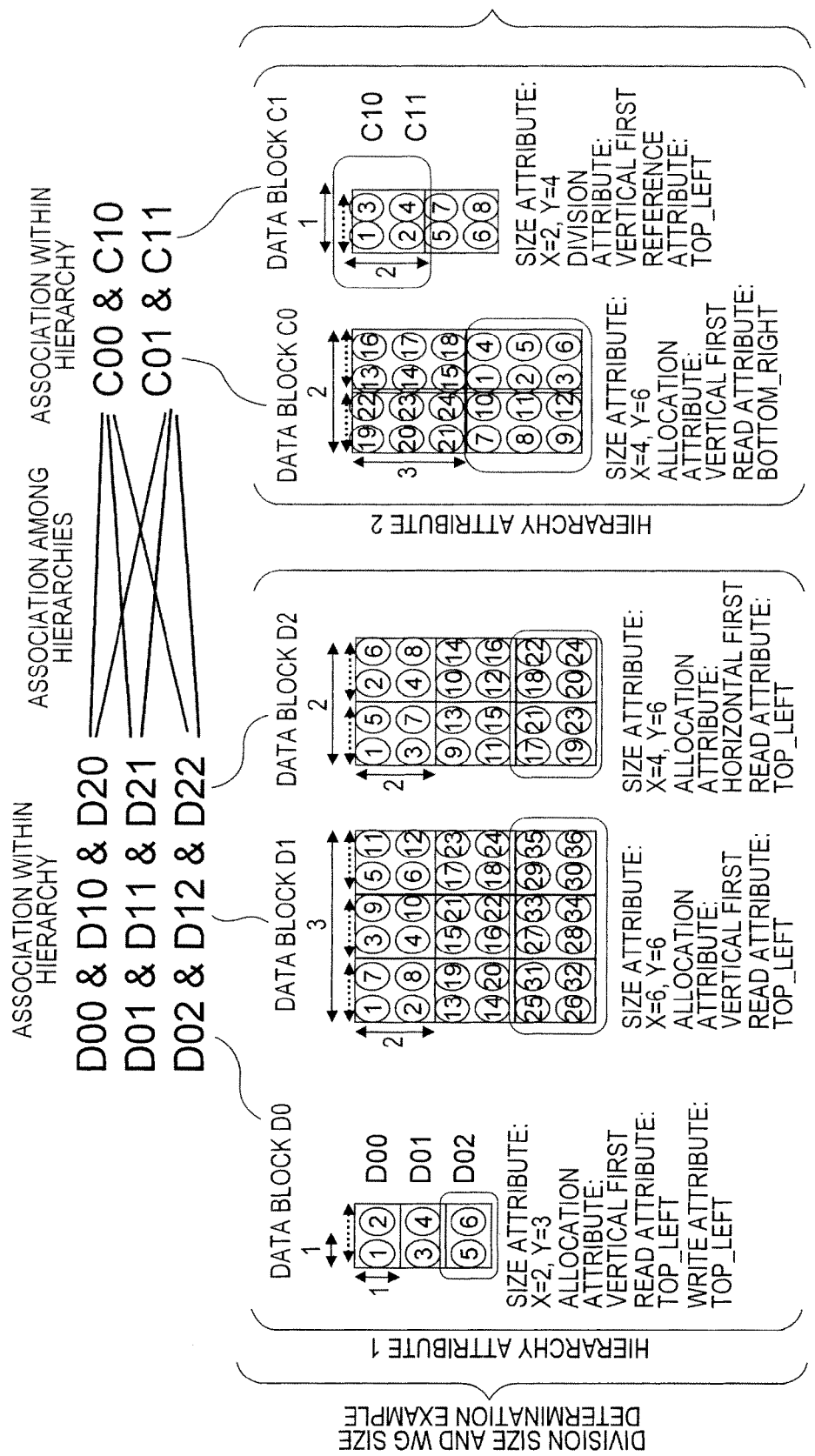
FIG. 11 is a diagram illustrating an association within each hierarchy and an association between the hierarchies.

FIG. 11 illustrates an example of the work group size WGs, the vertical division size (size SBsy of sub-block in Y-direction), and the number of iterations, which are determined by the scenario determination unit 134 on the basis of the attribute group designated for the read block P, the read block Q, and the write block R illustrated in FIG. 9, and the parameters representing the configuration of the arithmetic unit 140 illustrated in FIG. 10.

The scenario determination unit 134 first provisionally determines the work group size WGs (32) of the arithmetic unit 140. When it is assumed that the number of divisions of the respective data blocks in which the hierarchy attribute is "1" is 4, a private memory share by the read blocks Q is 0.258 KB of "129×2B" for each of the items. The value "129" is obtained by adding 9 in the Y-direction designated by the margin attribute to "Y-direction size Ly (480) of read block Q/the number of divisions (4)" (vertical division size). Likewise, the private memory share by the write blocks R is 0.738 KB of "480/4×4B" for each of the work items WI.

A sum of the private memory shares for each of the items by the read block Q and the write block R is smaller than the private memory capacity (1 KB) for each of the items in the parameter (FIG. 10) representing the configuration of the arithmetic unit 140. Therefore, since the rule 1 is satisfied, the work group sizes WGs and the division sizes of the read block Q and the write block R are determined. Also, the number of iterations is calculated as "5" in conformity to the above Expression (6).

Also, the read block P in which the hierarchy attribute is "2" is allocated to the local memories because the broadcast attribute is "on". Also, since the size (3×3=9) is smaller than the local memory capacity 4 KB for each of the work groups WG of the arithmetic unit 140, the read block P is transferred to the local memories without division (the number of iterations: 1).

Finally, the operation of the scenario determination unit 134 when there is the data block in which the dependency attribute is "with dependency" will be described. For facilitation of understanding the following description, the sub-block groups associated after the respective data blocks are divided into the respective division sizes are called "sub-block assembly".

If the sub-blocks between the sub-block assemblies have the dependency relationship, the scenario determination unit 134 controls the order of iterations so that the sub-block assembly of a dependent target is subjected to processing after the sub-block assembly of a dependent source has been subjected to processing. In this example, when it is assumed that one sub-block MX within a sub-block assembly M0 has a dependency relationship with one sub-block MY within a sub-block assembly M1, and the MX is a definition source, the sub-block assemblies M0 and M1 have the dependency relationship, and the M0 is called "a dependence source of the M1", and the M1 is called "a dependence target of the M0".

Thus, in the OpenCL system 100 according to this embodiment, the scenario determination unit 134 is disposed in the device 120, and automatically determines the transfer system on the basis of the attribute group of the respective data blocks of the arithmetic target indicated by the argument of the Kernel from the host 110 and the arithmetic results, and the parameters representative of the configuration of the arithmetic unit 140, and also controls the transfer of data by the determined transfer system, and the arithmetic operation by the arithmetic unit 140. For that reason, the contents necessary to be designated when the user develops the Kernel are only the designation of the attribute groups and the designation of the user processing as illustrated in FIG. 13. When FIGS. 13 and 24 are compared with each other, in the OpenCL system 100 according to this embodiment, all of the contents designated by the user are simple without depending on the configuration of the device.

For that reason, the user can emphasize the designation of the contents of the arithmetic processing for development, and is freed from a load of design of the data transfer associated with the arithmetic processing. The scenario determination unit 134 may be designed by experts on the configuration of the device 120, for example, developers belonging to manufacturers of the device 120.

In the OpenCL, under the assumption that there are some experts who try to bring out the ultimate arithmetic performance of hardware among software developers, only abstract API may be daringly prepared on the basis of a policy that freedom is given to such experts to freely control the hardware. On the other hand, if there is only the abstract API, persons who can use the API are limited to only the experts familiar with the hardware, resulting in a risk that population using the standards purposely defined is not increased. The technique according to the present invention can reduce a load of the user as described above, and enables an expansion of the population using the standards to be expected. Also, the technique according to the present invention allows the user to set the specific attribute and the arithmetic attribute necessary for arithmetic operation, as well as the policy attribute, thereby being capable of giving the user a certain extent of freedom.

Further, for example, "mode attribute" indicative of any one of "standard mode" and "expert mode" can be set in the argument of the Kernel. The device 120 refers to the set mode attribute, and controls the determination of the transfer system by the above-mentioned scenario determination unit 134 if the mode attribute is "standard mode". On the other hand, if the mode attribute is "expert mode", the device 120 may conduct the operation of the related art OpenCL device. With the above configuration, the so-called experts familiar with the configuration of the hardware can set "expert mode", and use only the abstract API to develop the Kernel as in the related art.

The advantages obtained by the OpenCL system 100 will be described in more detail. First, the related art case will be described without using the technique of the present invention. FIG. 14 illustrates a program code of the Kernel when the PEs access directly to the global memories to transfer data, without using the private memories and the local memories, in order to realize the arithmetic processing in the example illustrated in FIG. 2.

The program codes illustrated in FIG. 14 are simple in the contents, and small in the number of codes because there is no data transfer between the global memory space and the private memories and/or the local memory sections.

However, the above configuration is not high in the performance of the arithmetic processing. Therefore, in order to improve the performance, it is necessary to transfer data to be subjected to the arithmetic operation from the global memory to the private memories and/or the local memories by the read transfer, and transfer data of the arithmetic results from the private memories and/or the local memories to the global memory by the write transfer. An example of the program code in the related art Kernel for realizing the arithmetic processing associated with the above transfer is illustrated in FIG. 15. As is understood from FIG. 15, the number of program codes is increased, and the configuration becomes complicated as compared with those in FIG. 14.

FIG. 16 illustrates the program code of the Kernel for realizing the processing illustrated in FIG. 2 in the OpenCL system 100. In the figure, a function "get_acl_local_size( )" is an example of a system function for returning the division size, which is added to realize the determination and execution of the scenario by the scenario determination unit 134. Obviously, this Kernel is small in the number of codes and simple in the configuration as compared with the example illustrated in FIG. 15 which realizes the equivalent function.

According to the technique of the present invention, the Kernel can be easily developed, and the excellent portability is provided because the designation contents by the user do not depend on the configuration of the device. Now, a case in which the OpenCL device of the target accepts asynchronous memory transfer is compared with a case in which the OpenCL device does not accept the asynchronous memory transfer.

When the technique according to the present invention is not used, if the target changes from the device that does not accept the asynchronous memory transfer to the device accepting the asynchronous memory transfer, it is necessary to change the program code illustrated in FIG. 15 to the program code illustrated in FIG. 17. As is understood from a comparison of FIG. 15 with FIG. 17, the number of program codes and the configuration are largely changed.

Figure 18:
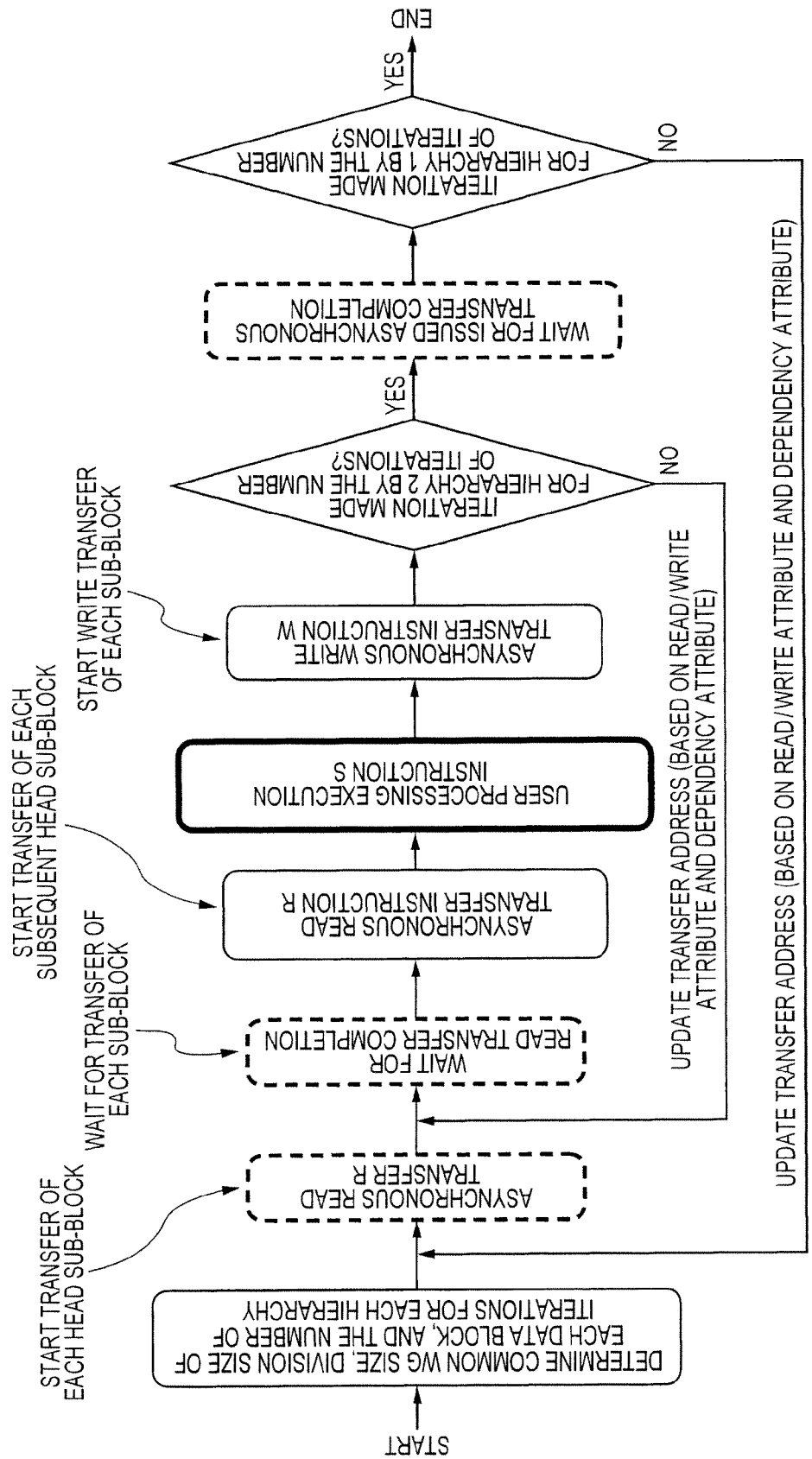
FIG. 18 is a diagram illustrating a difference in processing of the scenario determination unit in the OpenCL system illustrated in FIG. 1 when the arithmetic operation illustrated in FIG. 2 is intended to be realized in the OpenCL device that accepts or does not accept the asynchronous memory transfer.
Figure 19:
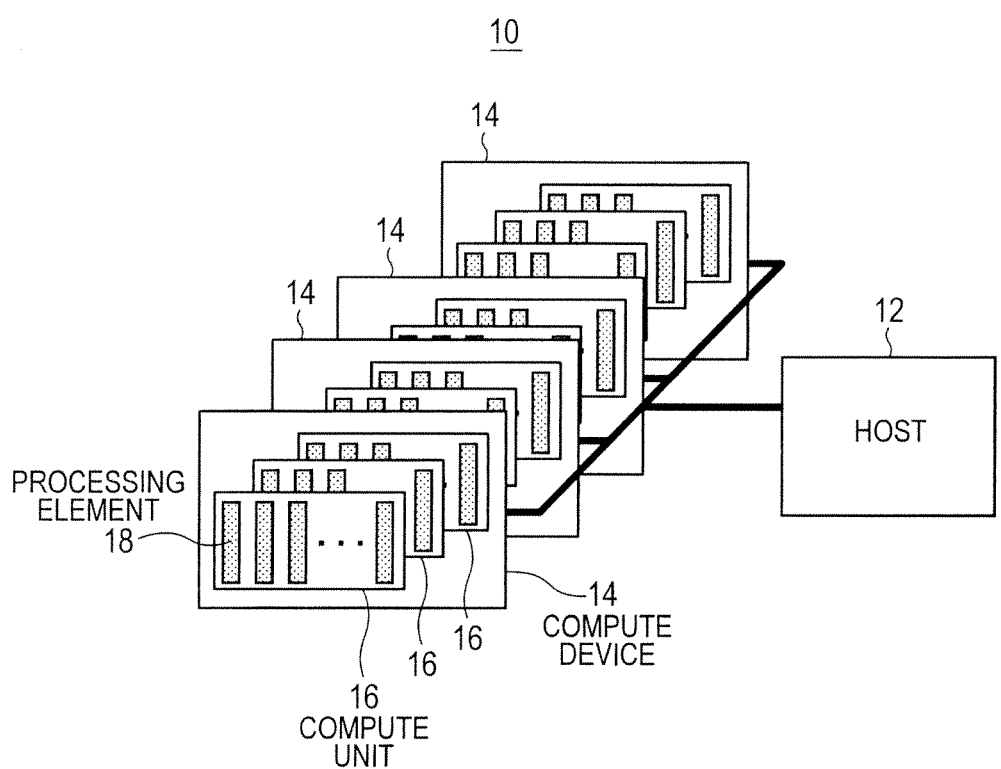
FIG. 19 is a diagram illustrating a platform model of the OpenCL system.
Figure 20:
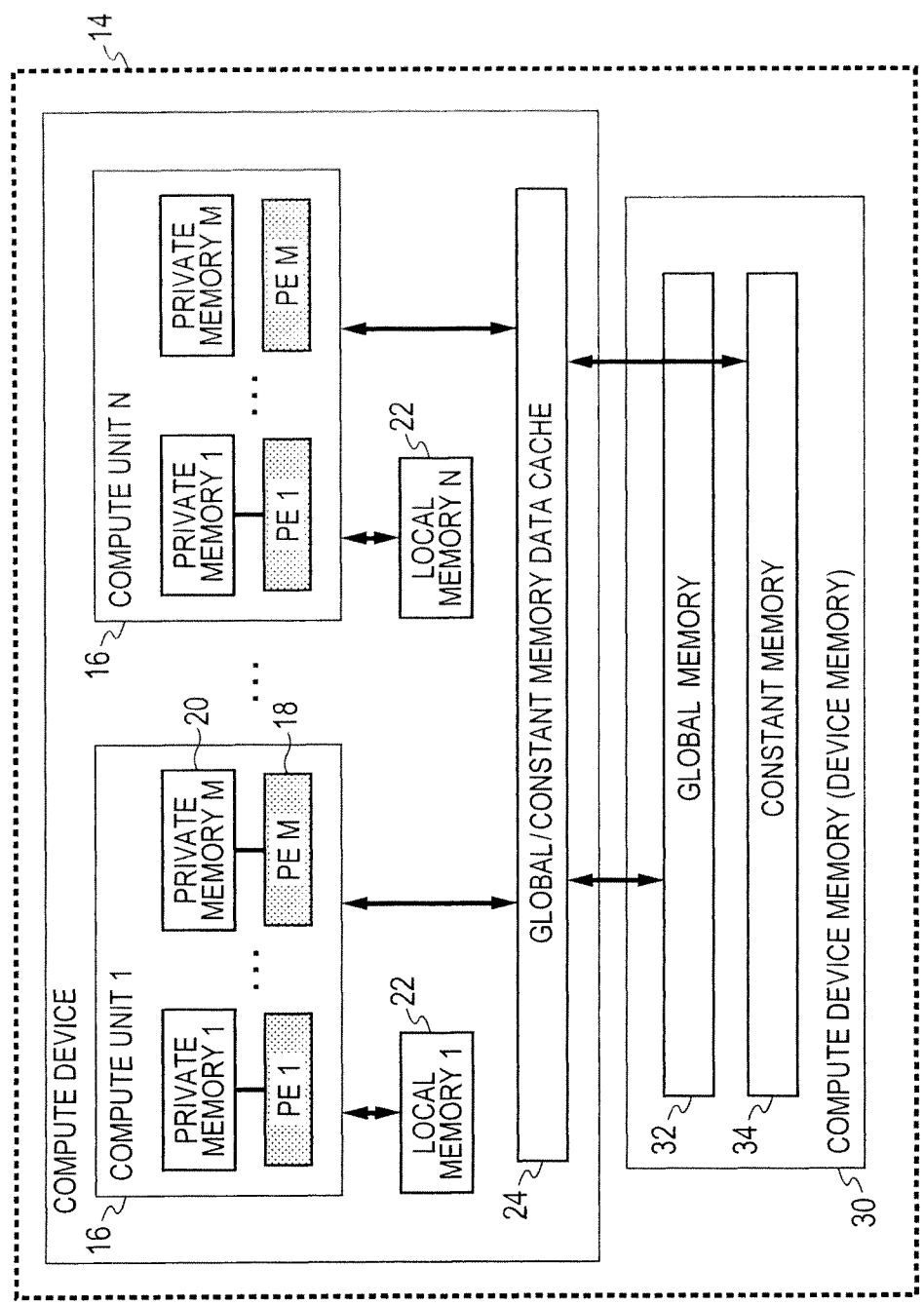
FIG. 20 is a diagram illustrating a configuration of the OpenCL device.
Figure 23:
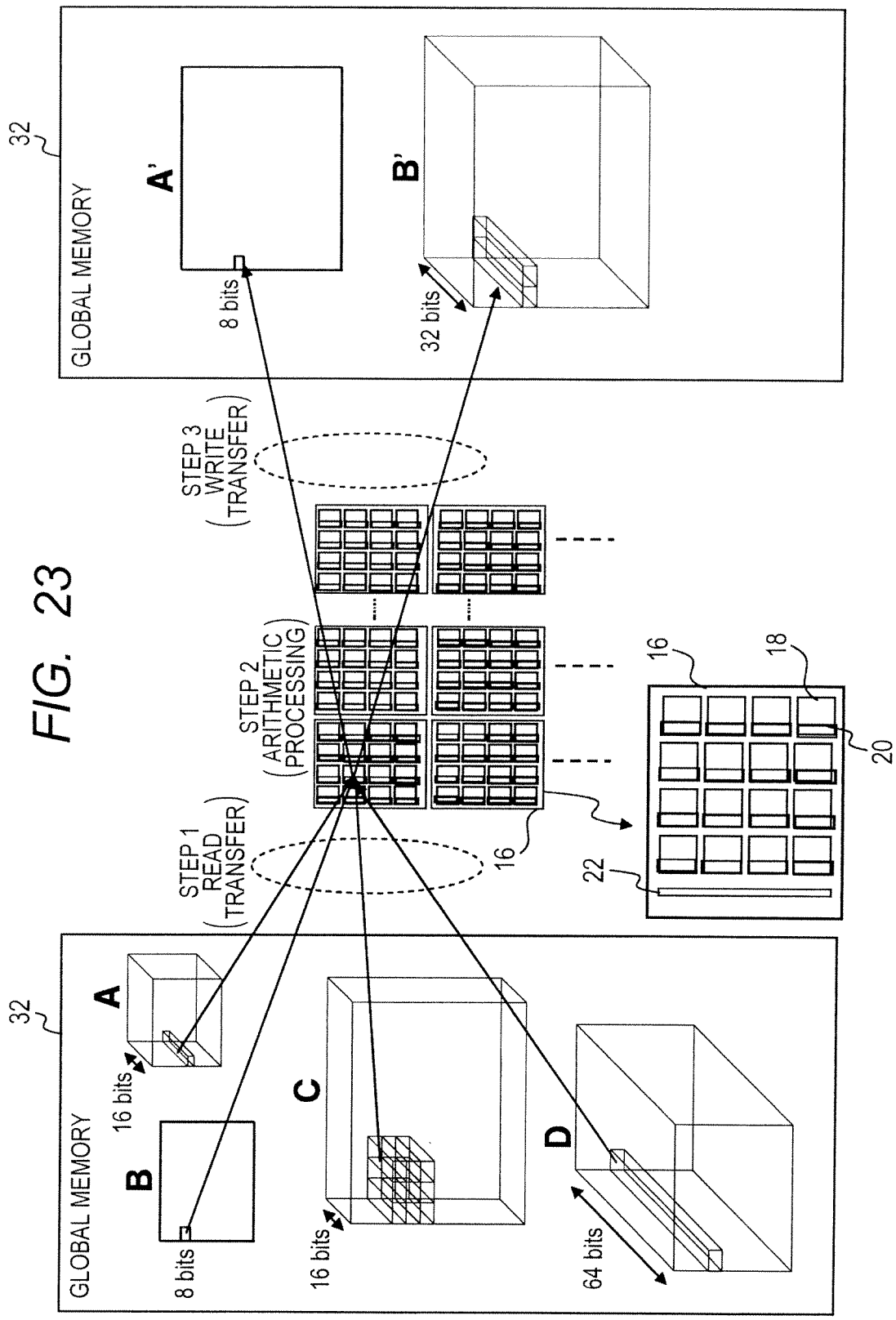
FIG. 23 is a diagram illustrating a problem with the related art (No. 1)

FIG. 18 illustrates an example of a processing flow of the scenario determination unit 134 in the device that accepts the asynchronous memory transfer and the device that does not accept the asynchronous memory transfer. In the drawing, dotted frames represent processing added to the processing flow in the case of the device that does not accept asynchronous memory, in the case of the device that accepts the asynchronous memory.

As illustrated in the figure, even if the configuration of the device is changed, the load of the developers of the scenario determination unit 134 is reduced with some change of the scenario determination unit 134.

Further, according to the technique of the present invention, a difference in the configuration of the devices is absorbed by the scenario determination unit 134. Therefore, as the Kernel for realizing the arithmetic processing illustrated in FIG. 2, the same Kernel illustrated in FIG. 16 can be used in the case of the device that accepts the asynchronous memory and the case of the device that does not accept the asynchronous memory. Thus, the portability is excellent.

The present invention has been described above with reference to the embodiments. The embodiments are exemplified, and the above embodiments may be variously changed or modified without departing from the subject matter of the present invention. It would be obvious to an ordinary skilled person that those modified examples of the embodiment fall within the scope of the present invention.

What is claimed is:

1. An arithmetic and control unit that controls a parallel arithmetic operation by a plurality of arithmetic elements of a parallel processor including the plurality of arithmetic elements, and a plurality of memories different in hierarchy which are disposed for the plurality of arithmetic elements, the arithmetic and control unit comprising:

an attribute group holding unit that acquires and holds attribute groups designated for respective data blocks of arithmetic subject and arithmetic result, the data blocks of arithmetic subject comprising read blocks in which data to be subjected to the parallel arithmetic operation is transferred to a memory of another hierarchy in the read blocks stored in a memory of a lowest hierarchy among the plurality of memories, and the data blocks of arithmetic result comprising write blocks that include an arithmetic result of the parallel arithmetic operation conducted on the read blocks in the write blocks which are transferred from the memory of the another hierarchy to the memory of the lowest hierarchy after the parallel arithmetic operation; and a scenario determination unit that determines respective transfer systems of the read blocks and the write blocks on a basis of the respective attribute groups held by the attribute group holding unit, and a configuration parameter representing a configuration of the parallel processor, and controls the transfer of the read blocks and the write blocks according to the determined transfer systems, and the parallel arithmetic operation corresponding to the transfer, wherein each of the attribute groups is necessary to determine the transfer systems, and includes one or more attributes not depending on the configuration of the parallel processor, and wherein the attribute groups of the write blocks are set assuming that each of the write blocks has already been located in the memory of the another hierarchy, and is transferred to the memory of the lowest hierarchy.

2. The arithmetic and control unit according to claim 1, wherein the parallel processor comprises an OpenCL (open computing language) device, and each of the attribute groups is set as an argument of a Kernel.

3. An arithmetic and control method that controls a parallel arithmetic operation by a plurality of arithmetic elements of a parallel processor including the plurality of arithmetic elements, and a plurality of memories different in hierarchy which are disposed for the plurality of arithmetic elements, the arithmetic and control method comprising:

acquiring and holding attribute groups designated for respective data blocks of arithmetic subject and arithmetic result, the data blocks of arithmetic subject comprising read blocks in which data to be subjected to the parallel arithmetic operation is transferred to a memory of another hierarchy in the read blocks stored in a memory of a lowest hierarchy among the plurality of memories, and the data blocks of arithmetic result comprising write blocks that include an arithmetic result of the parallel arithmetic operation conducted on the read blocks in the write blocks which are transferred from the memory of the another hierarchy to the memory of the lowest hierarchy after the parallel arithmetic operation; and determining respective transfer systems of the read blocks and the write blocks on a basis of the respective held attribute groups, and a configuration parameter representing a configuration of the parallel processor, and controlling the transfer of the read blocks and the write blocks according to the determined transfer systems, and the parallel arithmetic operation corresponding to the transfer, wherein each of the attribute groups is necessary to determine the transfer systems, and includes one or more attributes not depending on the configuration of the parallel processor, and wherein the attribute groups of the write blocks are set assuming that each of the write blocks has already been located in the memory of the another hierarchy, and is transferred to the memory of the lowest hierarchy.

4. The arithmetic and control method according to claim 3, wherein the parallel processor comprises an OpenCL (open computing language) device, and each of the attribute groups is set as an argument of a Kernel.

5. A non-transitory computer readable medium storing a program causing a computer to execute a process for controlling a parallel arithmetic operation by a plurality of arithmetic elements of a parallel processor including the plurality of arithmetic elements, and a plurality of memories different in hierarchy which are disposed for the plurality of arithmetic elements, the process comprising:

acquiring and holding attribute groups designated for respective data blocks of arithmetic subject and arithmetic result, the data blocks of arithmetic subject comprising read blocks in which data to be subjected to the parallel arithmetic operation is transferred to a memory of another hierarchy in the read blocks stored in a memory of a lowest hierarchy among the plurality of memories, and the data blocks of arithmetic result comprising write blocks that include an arithmetic result of the parallel arithmetic operation conducted on the read blocks in the write blocks which are transferred from the memory of the another hierarchy to the memory of the lowest hierarchy after the parallel arithmetic operation; and determining respective transfer systems of the read blocks and the write blocks on a basis of the respective held attribute groups, and a configuration parameter representing a configuration of the parallel processor, and controlling the transfer of the read blocks and the write blocks according to the determined transfer systems, and the parallel arithmetic operation corresponding to the transfer, wherein each of the attribute groups is necessary to determine the transfer systems, and includes one or more attributes not depending on the configuration of the parallel processor, and wherein the attribute groups of the write blocks are set assuming that each of the write blocks has already been located in the memory of the another hierarchy, and is transferred to the memory of the lowest hierarchy.

6. The non-transitory computer readable medium according to claim 5, wherein the parallel processor comprises an OpenCL (open computing language) device, and each of the attribute groups is set as an argument of a Kernel.

7. A parallel processor, comprising:

a plurality of arithmetic elements, a plurality of memories different in hierarchy which are disposed for the plurality of arithmetic elements; and an arithmetic controller that controls a parallel arithmetic operation by the arithmetic elements, the arithmetic controller including:
   an attribute group holding unit that acquires and holds attribute groups designated for respective data blocks of arithmetic subject and arithmetic result, the data blocks of arithmetic subject comprising read blocks in which data to be subjected to the parallel arithmetic operation is transferred to a memory of another hierarchy in the read blocks stored in a memory of a lowest hierarchy among the plurality of memories, and the data blocks of arithmetic result comprising write blocks that include an arithmetic result of the parallel arithmetic operation conducted on the read blocks in the write blocks which are transferred from the memory of the another hierarchy to the memory of the lowest hierarchy after the parallel arithmetic operation; and
   a scenario determination unit that determines respective transfer systems of the read blocks and the write blocks on a basis of the respective attribute groups held by the attribute group holding unit, and a configuration parameter representing a configuration of the parallel processor, and controls the transfer of the read blocks and the write blocks according to the determined transfer systems, and the parallel arithmetic operation corresponding to the transfer,
wherein each of the attribute groups is necessary to determine the transfer systems, and includes one or more attributes not depending on the configuration of the parallel processor, and
wherein the attribute groups of the write blocks are set assuming that each of the write blocks has already been located in the memory of the another hierarchy, and is transferred to the memory of the lowest hierarchy.

8. The parallel processor according to claim 7, wherein the parallel processor comprises an OpenCL (open computing language) device, and each of the attribute groups is set as an argument of a Kernel.

* * * * *